United States Patent
Zhang

(10) Patent No.: US 7,750,588 B2
(45) Date of Patent: Jul. 6, 2010

(54) METHOD OF COUNTING DRIVE MOTOR ROTATIONS, AND MEMORY MODULES, STORAGE MEDIA, AND MOTOR AND VEHICLE APPARATUSES UTILIZING SAME

(75) Inventor: Xuyang Zhang, Madison Heights, MI (US)

(73) Assignee: Faurecia Automotive Seating Canada Limited, Mississauga, Ontario (CA)

( * ) Notice: Subject to any disclaimer, the term of this patent is extended or adjusted under 35 U.S.C. 154(b) by 598 days.

(21) Appl. No.: 11/771,759

(22) Filed: Jun. 29, 2007

(65) Prior Publication Data
US 2008/0000957 A1 Jan. 3, 2008

Related U.S. Application Data

(60) Provisional application No. 60/806,236, filed on Jun. 29, 2006.

(51) Int. Cl.
*G05D 3/00* (2006.01)

(52) U.S. Cl. ............... 318/466; 318/264; 318/265; 318/266; 318/272; 318/275; 318/286; 318/467; 318/468; 235/203

(58) Field of Classification Search ......... 318/264–266, 318/272, 275, 286, 466–468; 235/203
See application file for complete search history.

(56) References Cited

U.S. PATENT DOCUMENTS

| | | | | | |
|---|---|---|---|---|---|
| 4,404,632 | A | * | 9/1983 | Harada et al. | 701/49 |
| 4,608,637 | A | * | 8/1986 | Okuyama et al. | 701/49 |
| 4,706,194 | A | * | 11/1987 | Webb et al. | 701/49 |
| 4,845,620 | A | * | 7/1989 | Parker | 701/49 |
| 5,179,328 | A | * | 1/1993 | Furuse et al. | 318/603 |
| 6,064,165 | A | * | 5/2000 | Boisvert et al. | 318/465 |
| 6,320,341 | B1 | * | 11/2001 | Oka et al. | 318/466 |
| 6,677,720 | B2 | * | 1/2004 | Fraser | 318/445 |
| 7,053,575 | B2 | * | 5/2006 | Fukuhara et al. | 318/538 |
| 7,061,196 | B2 | * | 6/2006 | Noro et al. | 318/443 |
| 2002/0185985 | A1 | * | 12/2002 | Fraser | 318/445 |

* cited by examiner

*Primary Examiner*—Walter Benson
*Assistant Examiner*—Kawing Chan
(74) *Attorney, Agent, or Firm*—Patrick J. Hofbauer

(57) ABSTRACT

A method of accurately maintaining, in position registers of memory modules, a net count of rotor signals received from a motor equipped with a rotor position sensor. A vehicle apparatus includes the memory modules and motor, as well as a driven component and processors that: (a) adjust the net count while the motor is driven; (b) monitor for, and terminate power upon encounter of, a mechanical stop; and (c) correct the net count for rotor signals received thereafter. Storage media and memory modules are encoded with processor instructions and processor-readable code that, when executed by processors, cause them to perform the method.

38 Claims, 15 Drawing Sheets

METHOD OF COUNTING DRIVE MOTOR ROTATIONS, AND MEMORY MODULES, STORAGE MEDIA, AND MOTOR AND VEHICLE APPARATUSES UTILIZING SAME

FIELD OF THE INVENTION

The present invention relates to the field of drive motors, and more particularly, to a method of counting drive motor rotations, and memory modules, storage media, and motor and vehicle apparatuses utilizing same.

BACKGROUND OF THE INVENTION

Automotive vehicles seats are commonly provided with motor-driven seat assemblies and a memory module that has one or more seat position registers for storing the seats' current positions. In the prior art, such memory modules may have been used, when activated, in an attempt to return vehicle seat assemblies to stored seat positions. A stored seat position may, for example, be one that corresponds to a particular seat occupant's preferences, physical characteristics (e.g., height), etc.

Motors have previously been used to drive such seat assemblies, and to drive other vehicle (as well as non-vehicular) components. In the prior art, Hall-effect sensors may have been used in such motors in an attempt to accurately record the actual position of the driven component at any particular time. With every motor revolution occurring in such a prior art system (or more particularly, with every rotation of a rotor within the prior art motor), a pulse signal may have been generated by a Hall-effect sensor built into the motor (e.g., a DC motor). In the prior art, when a pulse signal was detected by the memory module, the data stored in its seat position register it may have been adjusted. Thus, when activated, prior art memory modules may heretofore have used a stored count of (rotor position) pulse signals in an attempt to return a vehicle seat assembly to the stored seat position.

Other prior art systems, which do not use Hall-effect sensors, that have been sought to be used to similar effect may have included ripple-counting based systems. Such systems may have counted modulation (or "ripple") signals that occur in the current during commutation.

Now, it may generally be thought, though it is not essential to the working of the present invention, that a pulse signal conveyed by a Hall-effect sensor (or a ripple signal that is counted by a ripple-counting based system) corresponds to a specified amount of rotation (or partial rotations) of the motor's rotor. It should, however, be appreciated that these signals do not include any information about motor rotary direction. Rotational counting errors may have arisen from this fact and from the fact that all rotational counts may heretofore have been incrementally added to the count register according to the direction (polarity) of the voltage or current that was applied to the drive motor.

Notably, however, both of these prior art systems may have been subject to the same general types of problems, insofar as they may have generated (and accumulated) positional errors in their count. These positional errors in the count may have been known to occur with increased frequency when a seat or other driven component encounters an obstacle.

Where the motion of the driven component, or of the drive motor, is stopped because of a mechanical stop or obstacle, the force on the system may be released in a manner that is similar to the recoil force of a spring. That is, encountering a mechanical stop or obstacle may cause the drive motor to rotate in a direction that is opposite to that which might be indicated by the supplied polarity of the voltage or current.

Prior art position registers may have failed to account for this sudden change of direction, and any additional (reverse-direction) rotations may have been recorded, and accumulated, in the prior art position registers as being rotations in the original rotational direction. At least in this manner, prior art memory modules may been subject to the introduction of count errors into their position registers.

In fact, these errors may have accumulated in the prior art memory modules' position registers so rapidly that the count error might reach to noticeable levels after only a few (or several) cycles. It may be generally thought, though it is not essential to an understanding of the present invention or its workings, that benchmark data in this regard may be available.

These positional errors in prior art systems may have generally tended to accumulate over time and to have caused the recorded seat (or other component) position to vary from its actual position. Inaccurately recorded positions for the seats relative to the steering column, pedals, and mirrors may have generally tended to result in customer irritation and/or in reduced safety. Of course, memory modules for motor-driven adjustable mirrors, pedals, and/or steering columns may have been subject similar problems.

It is notable that persons having ordinary skill in the art may have been previously thought that, when a drive motor was energized with a certain polarity of voltage, it would only rotate in a certain rotational direction. Previously, it may also have been generally thought that, even after the supply of power to the drive motor had been cut off, the motor would continue to rotate in same direction (i.e., the direction of its rotation whilst being powered) on account of inertial effects. That is, it may have been previously thought by persons having ordinary skill in the art that, after a voltage of a known polarity was supplied to a drive motor, all rotor position signals that were thereafter received (whether from a connected Hall-effect sensor or ripple signals that were counted in ripple-counting based system) were indicative of that drive motor's rotor movement in a single rotational direction—i.e., at least until a change in voltage polarity was detected.

Moreover, a corresponding rotational count (indicative of a single rotational direction) may previously have been added to the respective seat position register in prior art memory modules. That is, when power to prior art drive motor was switched off, the counting of revolutions continued in the same direction.

The aforementioned prior art systems may, however, have relied upon an untrue assumption in so adjusting the data stored in the seat position register—i.e., without recognizing that, regardless of the voltage polarity and voltage value between the two terminals of a motor, either of two possible rotary directions (clockwise or counterclockwise) may be possible.

Recently, some OEMs may, in an attempt to avoid some of the aforementioned problems in the prior art, have been reticent (or may have even outright refused) to use Hall-effect sensor based systems.

Now, although prior art memory module suppliers may have developed various attempted solutions to address the issue of accumulated count errors, to date, none of these rudimentary attempts have been particularly satisfactory (perhaps least of all to the end users).

One rudimentary attempt to solve the perceived problems that may be generally well-known may have been to automatically have the memory module move the seat to an end stop reference position after every 100 (or 200) motor motions, i.e., so as to reset the seat position register. This "reset" technology may have attempted to guarantee that the accumulated position error will not exceed a certain value. However, in attempting to solve one problem, this methodology may actually have caused a number of other problems. For example, if a passenger or an obstacle (e.g., stowed item) happens to be in a second row seat when a memory module moves a front seat rearward to reset its seat position register, the seat may impact upon the passenger or damage the stowed item. In view of the foregoing, it may be appreciated that this attempted solution represents a safety problem.

All the same, OEMs and end users may have little option, since memory modules not incorporating "reset" technology may exhibit large and increasing positional errors. Of course, such positional errors may also be dangerous, and if nothing else, these accumulated positional errors may tend to result in user dissatisfaction.

It should perhaps be noted that, in the past, an alternative to the use of Hall-effect sensor and ripple-counting based systems may have been to use potentiometer based systems. Though such potentiometer based systems may not have accumulated positional errors in the same way, significant disadvantages of such systems may have been generally well documented. These disadvantages may include high cost, noise, large package size, and/or a resolution that is limited by analog to digital conversion.

In view of all of the foregoing, it may be desirable to eliminate and/or minimize these positional errors, and/or to mitigate their negative consequences, in Hall-effect sensor and ripple-counting based systems. It may also be desirable to provide a memory module system that is able to detect a mechanical stop or obstacle that is encountered by the driven component. Still further, it may be desirable to provide a technology which is equally applicable in improving the accuracy of Hall-effect and ripple-counting based systems.

Of course, it may also be desirable to provide a component position recording device that may be relatively inexpensive to manufacture, may be readily mass-produced, and/or one that may fits into a relatively small design envelope. It may also be desirable to provide such a system that is both highly reliable and cost effective.

Accordingly, it is an object of this invention to obviate or mitigate at least one of the above-mentioned disadvantages of the prior art.

SUMMARY OF THE INVENTION

In accordance with the present invention there is disclosed a method of accurately maintaining, in one or more position registers of one or more memory modules, a stored net count of rotor position signals received from a motor equipped with a rotor position sensor. The motor is operable to move a driven component. The method includes a first power-supplying step, a first counting step, a monitoring step, a first power-cutting step after the first power-supplying step, and a second counting step. The first power-supplying step is one of operatively providing a first supply of power to the motor. The first counting step is one of adjusting the net count, stored in the position registers, by a first adjustment directly related to a first quantity of rotor position signals received after the first power-supplying step. The monitoring step is one of monitoring at least one motor-related parameter for presence of a trip value indicative of one or more of the motor and the driven component having encountered a mechanical stop. The first power-cutting step is one of terminating the first supply of power in presence of the trip value. The second counting step is one of adjusting the net count, stored in the position registers, by a second adjustment directly related to a second quantity of rotor position signals received after the first power-cutting step. The first adjustment is a first one selected from an adjustment group consisting of an incremental adjustment and a decremental adjustment. The second adjustment is the respective other one selected from the adjustment group.

According to an aspect of one preferred embodiment of the invention, the method may preferably, but need not necessarily, further include a component-return step, after the second counting step, of returning the driven component to a memory position stored in one or more memory registers of the memory modules—preferably, but not necessarily, using the net count stored in the position registers of the memory modules.

According to an aspect of one preferred embodiment of the invention, the motor-related parameter may preferably, but need not necessarily, include a current draw of the motor. In the monitoring step, an ammeter may preferably, but need not necessarily, monitor the current draw of the motor.

According to an aspect of one preferred embodiment of the invention, the trip value may preferably, but need not necessarily, be in excess of about 10 amps.

According to an aspect of one preferred embodiment of the invention, the motor-related parameter may preferably, but need not necessarily, include a speed of the motor.

According to an aspect of one preferred embodiment of the invention, in the monitoring step, a tachometer may preferably, but need not necessarily, monitor the speed of the motor.

According to an aspect of one preferred embodiment of the invention, the motor-related parameter may preferably, but need not necessarily, include a load on the motor. In the monitoring step, a force transducer may preferably, but need not necessarily, monitor the load on the motor.

According to an aspect of one preferred embodiment of the invention, the method may preferably, but need not necessarily, further include a second power-supplying step after the second counting step, and/or a third counting step. The second power-supplying step may preferably, but need not necessarily, be one of providing a second supply of power to the motor. The third counting step may preferably, but need not necessarily, be one of adjusting the net count, stored in the position registers, by a third adjustment that may preferably, but need not necessarily, be directly related to a third quantity of rotor position signals received after the second power-supplying step. When the first supply and the second supply have identical polarities, the third adjustment may preferably, but need not necessarily, be the first one selected from the adjustment group. When the first supply and the second supply have opposing polarities, the third adjustment may preferably, but need not necessarily, be the respective other one selected from the adjustment group.

According to an aspect of one preferred embodiment of the invention, the method may preferably, but need not necessarily, further include a second power-cutting step after the second power-supplying step, and/or a fourth counting step. The second power-cutting step may preferably, but need not necessarily, be one of terminating the second supply of power in presence of the trip value. The fourth counting step may preferably, but need not necessarily, be one of adjusting the net count, stored in the position registers, by a fourth adjustment that may preferably, but need not necessarily, be directly related to a fourth quantity of rotor position signals received after the second power-cutting step. When the first supply and the second supply have opposing polarities, the fourth adjustment may preferably, but need not necessarily, be the first one selected from the adjustment group. When the first supply and the second supply have identical polarities, the fourth adjustment may preferably, but need not necessarily, be the respective other one selected from the adjustment group.

In accordance with the present invention there are also disclosed one or more processor-readable memory modules. The memory modules are for use with one or more processors, a motor equipped with a rotor position sensor, and a driven component that is operatively moved by the motor. The memory modules include one or more position registers. The memory modules are encoded with processor-readable code that is executable by the processors to perform a method of accurately maintaining, in the position registers, a stored net count of rotor position signals received from the motor. The method includes a first power-supplying step, a first counting step, a monitoring step, a first power-cutting step after the first power-supplying step, and a second counting step. The first power-supplying step is one of operatively providing a first supply of power to the motor. The first counting step is one of adjusting the net count, stored in the position registers, by a first adjustment directly related to a first quantity of rotor position signals received after the first power-supplying step. The monitoring step is one of monitoring at least one motor-related parameter for presence of a trip value indicative of one or more of the motor and the driven component having encountered a mechanical stop. The first power-cutting step is one of terminating the first supply of power in presence of the trip value. The second counting step is one of adjusting the net count, stored in the position registers, by a second adjustment directly related to a second quantity of rotor position signals received after the first power-cutting step. The first adjustment is a first one selected from an adjustment group consisting of an incremental adjustment and a decremental adjustment. The second adjustment is the respective other one selected from the adjustment group.

According to an aspect of one preferred embodiment of the invention, the memory modules may preferably, but need not necessarily, further include one or more memory registers adapted to store a memory position for the driven component. The method, performed by the processors executing the code on the memory modules, may preferably, but need not necessarily, further include a component-return step, after the second counting step, of returning the driven component to the memory position—preferably, but not necessarily, using the net count stored in the position registers of the memory modules.

According to an aspect of one preferred embodiment of the invention, the motor-related parameter may preferably, but need not necessarily, include a current draw of the motor. In the monitoring step of the method, performed by the processors executing the code on the memory modules, the processors may preferably, but need not necessarily, use ammeter signals received from an ammeter to monitor the current draw of the motor.

According to an aspect of one preferred embodiment of the invention, the trip value may preferably, but need not necessarily, be in excess of about 10 amps.

According to an aspect of one preferred embodiment of the invention, the motor-related parameter may preferably, but need not necessarily, include a speed of the motor.

According to an aspect of one preferred embodiment of the invention, in the monitoring step of the method, performed by the processors executing the code on the memory modules, the processors may preferably, but need not necessarily, use tachometer signals received from a tachometer to monitor the speed of the motor.

According to an aspect of one preferred embodiment of the invention, the motor-related parameter may preferably, but need not necessarily, include a load on the motor. In the monitoring step of the method, performed by the processors executing the code on the memory modules, the processors may preferably, but need not necessarily, use force-transducer signals received from a force transducer to monitor the load on the motor.

According to an aspect of one preferred embodiment of the invention, the method performed by the processors, executing the code on the memory modules, may preferably, but need not necessarily, further include a second power-supplying step after the second counting step, and/or a third counting step. The second power-supplying step may preferably, but need not necessarily, be one of providing a second supply of power to the motor. The third counting step may preferably, but need not necessarily, be one of adjusting the net count, stored in the position registers, by a third adjustment that may preferably, but need not necessarily, be directly related to a third quantity of rotor position signals received after the second power-supplying step. When the first supply and the second supply have identical polarities, the third adjustment may preferably, but need not necessarily, be the first one selected from the adjustment group. When the first supply and the second supply have opposing polarities, the third adjustment may preferably, but need not necessarily, be the respective other one selected from the adjustment group.

According to an aspect of one preferred embodiment of the invention, the method performed by the processors, executing the code on the memory modules, may preferably, but need not necessarily, further include a second power-cutting step after the second power-supplying step, and/or a fourth counting step. The second power-cutting step may preferably, but need not necessarily, be one of terminating the second supply of power in presence of the trip value. The fourth counting step may preferably, but need not necessarily, be one of adjusting the net count, stored in the position registers, by a fourth adjustment that may preferably, but need not necessarily, be directly related to a fourth quantity of rotor position signals received after the second power-cutting step. When the first supply and the second supply have opposing polarities, the fourth adjustment may preferably, but need not necessarily, be the first one selected from the adjustment group. When the first supply and the second supply have identical polarities, the fourth adjustment may preferably, but need not necessarily, be the respective other one selected from the adjustment group.

In accordance with the present invention there are additionally disclosed one or more processor-readable storage media. The storage media are for use with one or more processors, a motor equipped with a rotor position sensor, a driven component that is operatively moved by the motor, and one or more processor-readable memory modules that contain one or more position registers. The storage media are encoded with processor instructions that, when executed by the processors, cause the processors to perform a method of accurately maintaining, in the position registers, a stored net count of rotor position signals received from the motor. The method includes a first power-supplying step, a first counting step, a monitoring step, a first power-cutting step after the first power-supplying step, and a second counting step. The first power-supplying step is one of operatively providing a first supply of power to the motor. The first counting step is one of adjusting the net count, stored in the position registers, by a first adjustment directly related to a first quantity of rotor position signals received after the first power-supplying step. The monitoring step is one of monitoring at least one motor-related parameter for presence of a trip value indicative of one or more of the motor and the driven component having encountered a mechanical stop. The first power-cutting step is one of terminating the first supply of power in presence of the trip value. The second counting step is one of adjusting the net count, stored in the position registers, by a second adjustment directly related to a second quantity of rotor position signals received after the first power-cutting step. The first adjustment is a first one selected from an adjustment group consisting of an incremental adjustment and a decremental adjustment. The second adjustment is the respective other one selected from the adjustment group.

According to an aspect of one preferred embodiment of the invention, the method performed by the processors, executing the instructions encoded on the storage media, may preferably, but need not necessarily, further include a component-return step, after the second counting step, of returning the driven component to a memory position stored in one or more memory registers of the memory modules—preferably, but not necessarily, using the net count stored in the position registers of the memory modules.

According to an aspect of one preferred embodiment of the invention, the motor-related parameter may preferably, but need not necessarily, include a current draw of the motor. In the monitoring step of the method, performed by the processors executing the instructions encoded on the storage media, the processors may preferably, but need not necessarily, use ammeter signals received from an ammeter to monitor the current draw of the motor.

According to an aspect of one preferred embodiment of the invention, the trip value may preferably, but need not necessarily, be in excess of about 10 amps.

According to an aspect of one preferred embodiment of the invention, the motor-related parameter may preferably, but need not necessarily, include a speed of the motor.

According to an aspect of one preferred embodiment of the invention, in the monitoring step of the method, performed by the processors executing the instructions encoded on the storage media, the processors may preferably, but need not necessarily, use tachometer signals received from a tachometer to monitor the speed of the motor.

According to an aspect of one preferred embodiment of the invention, the motor-related parameter includes a load on the motor. In the monitoring step of the method, performed by the processors executing the instructions encoded on the storage media, the processors may preferably, but need not necessarily, use force-transducer signals received from a force transducer to monitor the load on the motor.

According to an aspect of one preferred embodiment of the invention, the method performed by the processors, executing the instructions encoded on the storage media, may preferably, but need not necessarily, further include a second power-supplying step after the second counting step, and/or a third counting step. The second power-supplying step may preferably, but need not necessarily, be one of providing a second supply of power to the motor. The third counting step may preferably, but need not necessarily, be one of adjusting the net count, stored in the position registers, by a third adjustment that may preferably, but need not necessarily, be directly related to a third quantity of rotor position signals received after the second power-supplying step. When the first supply and the second supply have identical polarities, the third adjustment may preferably, but need not necessarily, be the first one selected from the adjustment group. When the first supply and the second supply have opposing polarities, the third adjustment may preferably, but need not necessarily, be the respective other one selected from the adjustment group.

According to an aspect of one preferred embodiment of the invention, the method performed by the processors, executing the instructions encoded on the storage media, may preferably, but need not necessarily, further include a second power-cutting step after the second power-supplying step, and/or a fourth counting step. The second power-cutting step may preferably, but need not necessarily, be one of terminating the second supply of power in presence of the trip value. The fourth counting step may preferably, but need not necessarily, be one of adjusting the net count, stored in the position registers, by a fourth adjustment that may preferably, but need not necessarily, be directly related to a fourth quantity of rotor position signals received after the second power-cutting step. When the first supply and the second supply have opposing polarities, the fourth adjustment may preferably, but need not necessarily, be the first one selected from the adjustment group. When the first supply and the second supply have identical polarities, the fourth adjustment may preferably, but need not necessarily, be the respective other one selected from the adjustment group.

In accordance with the present invention there is further disclosed a motor apparatus for use in operatively moving a driven component between first and second positions. The motor apparatus includes a motor, one or more processor-readable memory modules, and one or more processors. The motor is equipped with a rotor position sensor. The memory modules contain one or more position registers adapted to store a net count of rotor position signals received from the motor. The processors are operatively adapted to: (i) provide a first supply of power to the motor; (ii) adjust the net count, stored in the position registers, by a first adjustment directly related to a first quantity of rotor position signals received after providing the first supply of power to the motor; (iii) monitor at least one motor-related parameter for presence of a trip value indicative of one or more of the motor and the driven component having encountered a mechanical stop; (iv) terminate the first supply of power in presence of the trip value; and (v) adjust the net count, stored in the position registers, by a second adjustment directly related to a second quantity of rotor position signals received after terminating the first supply of power. The first adjustment is a first one selected from an adjustment group consisting of an incremental adjustment and a decremental adjustment. The second adjustment is the respective other one selected from the adjustment group. According to the invention, the net count stored in the position registers of the memory modules accurately corresponds to an actual position of the driven component between the first and second positions.

According to an aspect of one preferred embodiment of the invention, the memory modules may preferably, but need not necessarily, further include one or more memory registers adapted to store a memory position for the driven component. The processors may preferably, but need not necessarily, be operatively adapted to selectively return the driven component to the memory position—preferably, but not necessarily, using the net count stored in the position registers of the memory modules.

According to an aspect of one preferred embodiment of the invention, the motor may preferably, but need not necessarily, be a direct current motor.

According to an aspect of one preferred embodiment of the invention, the rotor position sensor may preferably, but need not necessarily, be a Hall-effect sensor.

According to an aspect of one preferred embodiment of the invention, the rotor position sensor may preferably, but need not necessarily, include a ripple counting sensor that operatively counts current modulations during commutation of the motor.

In accordance with the present invention there is still further disclosed a vehicle apparatus that includes a motor, a driven vehicle component, one or more processor-readable memory modules, and one or more processors. The motor is equipped with a rotor position sensor. The vehicle component is operatively movable by the motor between first and second positions. The memory modules contain one or more position registers adapted to store a net count of rotor position signals received from the motor. The processors are operatively adapted to: (i) provide a first supply of power to the motor; (ii) adjust the net count, stored in the position registers, by a first adjustment directly related to a first quantity of rotor position signals received after providing the first supply of power to the motor; (iii) monitor at least one motor-related parameter for presence of a trip value indicative of one or more of the motor and the driven component having encountered a mechanical stop; (iv) terminate the first supply of power in presence of the trip value; and (v) adjust the net count, stored in the position registers, by a second adjustment directly related to a second quantity of rotor position signals received after terminating the first supply of power. The first adjustment is a first one selected from an adjustment group consisting of an incremental adjustment and a decremental adjustment. The second adjustment is the respective other one selected from the adjustment group. According to the invention, the net count stored in the position registers accurately corresponds to an actual position of the vehicle component between the first and second positions.

According to an aspect of one preferred embodiment of the invention, the memory modules may preferably, but need not necessarily, further include one or more memory registers adapted to store a memory position for the vehicle component. The processors may preferably, but need not necessarily, be operatively adapted to selectively return the vehicle component to the memory position—may preferably, but not necessarily, using the net count stored in the position registers of the memory modules.

According to an aspect of one preferred embodiment of the invention, the vehicle component may preferably, but need not necessarily, be a vehicle seat.

According to an aspect of one preferred embodiment of the invention, the vehicle component may preferably, but need not necessarily, be a vehicle steering column.

According to an aspect of one preferred embodiment of the invention, the vehicle component may preferably, but need not necessarily, include one or more vehicle side-view mirrors.

According to an aspect of one preferred embodiment of the invention, the vehicle component may preferably, but need not necessarily, include one or more vehicle pedals.

Other advantages, features and characteristics of the present invention, as well as methods of operation and functions of the related elements of the structures, and the combination of parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the method of counting drive motor rotations—and memory modules, storage media, and motor and vehicle apparatuses utilizing same—according to the present invention, as to their structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 10a depicts, in a diagrammatic flowchart, a first set of additional steps according to the invention that is supplemental to the method shown in FIG. 9a;

DETAILED DESCRIPTION OF A PREFERRED EMBODIMENT

Figure 1:
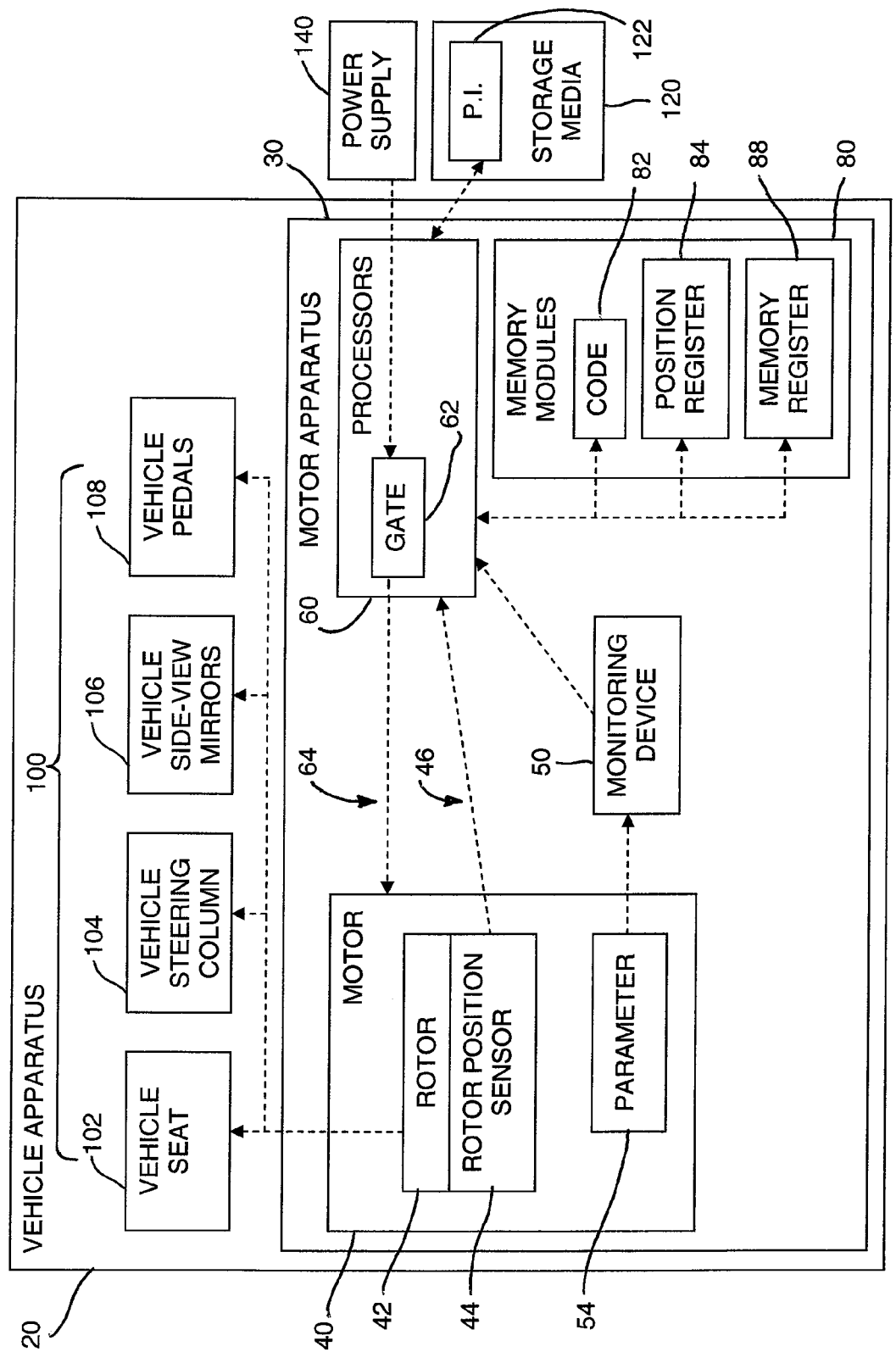
FIG. 1 is a schematic diagram depicting preferred embodiments of a vehicle apparatus and storage media according to the present invention, shown in use with a power supply.
Figure 5:
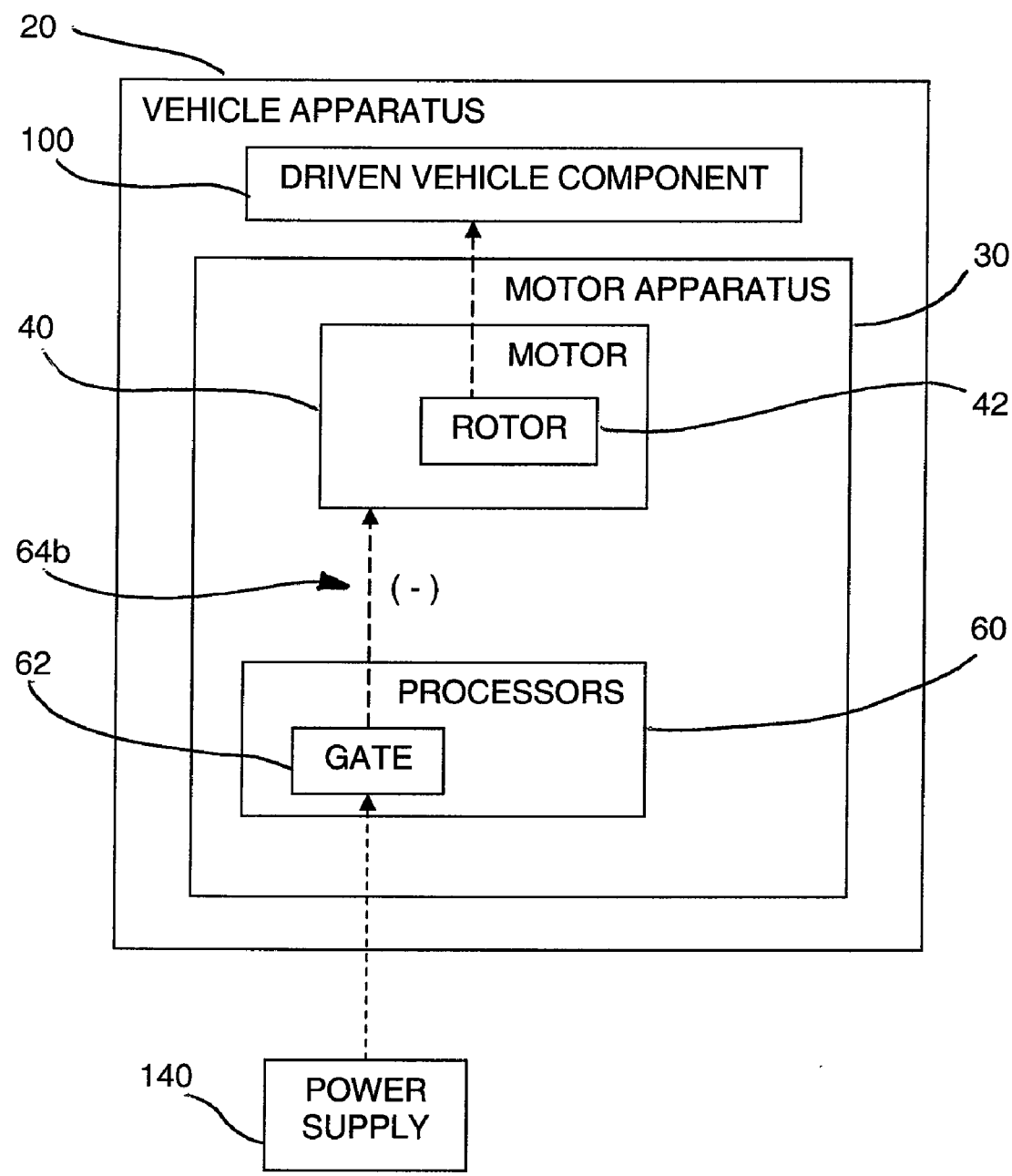
FIG. 5 is a schematic diagram similar to FIG. 3, showing a second supply of power that has an opposing polarity to the first supply shown in FIG. 3.
Figure 6:
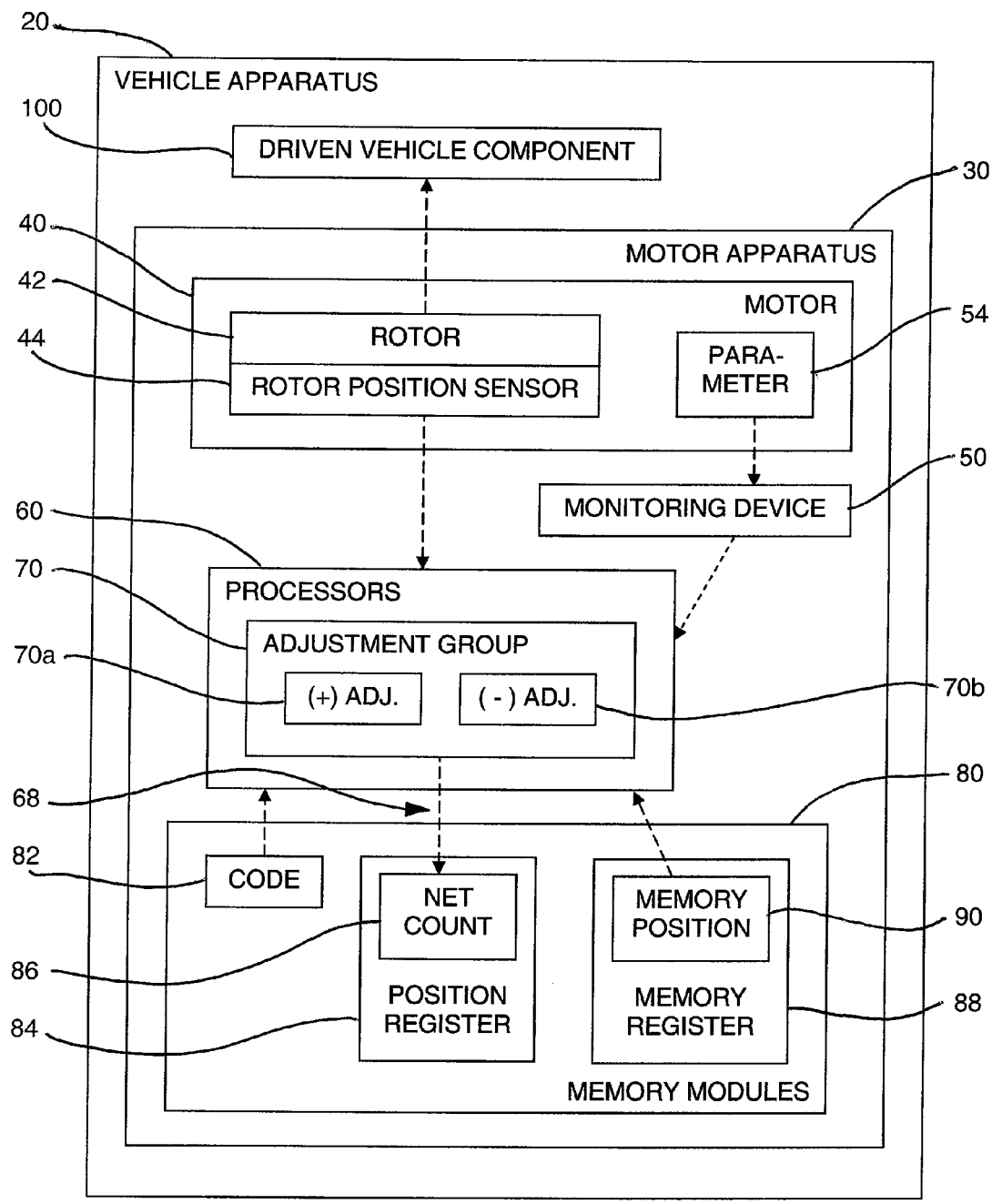
FIG. 6 is a schematic diagram similar to FIG. 2, showing a monitoring device and memory modules of the motor apparatus.
Figure 7:
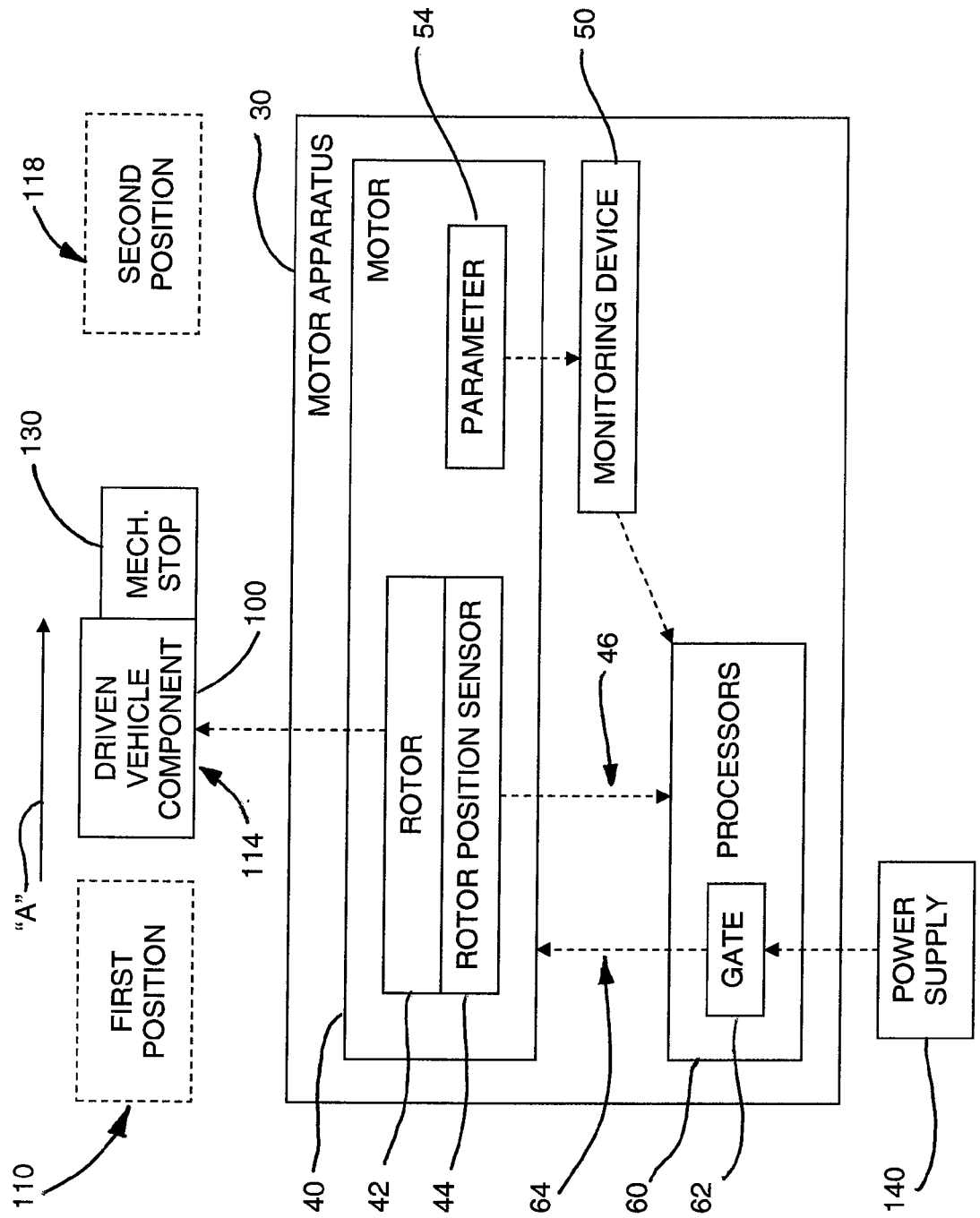
FIG. 7 is a schematic diagram depicting the motor apparatus of FIG. 2, shown in use driving a vehicle component.

Referring now to FIGS. 1 through 8c, there is shown a vehicle apparatus 20 according to a preferred embodiment of the present invention. The vehicle apparatus 20 includes a motor apparatus 30 and a driven vehicle component 100 (alternately, herein referred to as a driven component 100). As best seen in FIG. 7, the motor apparatus 30 operatively moves the driven component 100 between first and second positions, 110 and 118 respectively. As best seen in FIG. 1, the motor apparatus 30 includes a motor 40, processor-readable memory modules 80, and processors 60.

Preferably, and as best seen in FIG. 1, the vehicle component 100 may include a vehicle seat 102, a vehicle steering column 104, one or more vehicle side-view mirrors 106, and/or one or more vehicle pedals 108.

Figure 2:
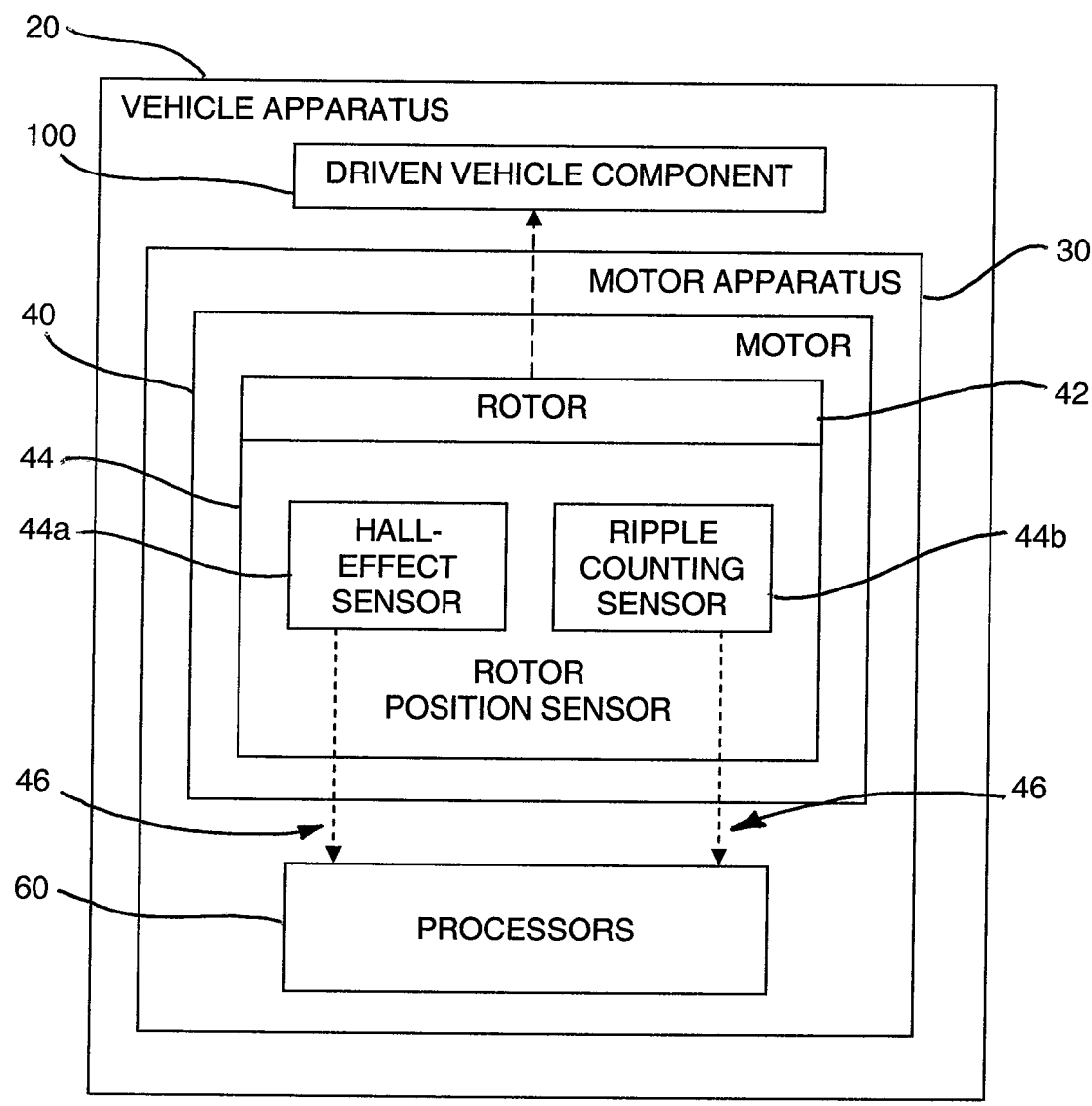
FIG. 2 is a schematic diagram depicting of the vehicle apparatus of FIG. 1, showing a driven vehicle component, and motor and processors of a motor apparatus thereof.
Figure 3:
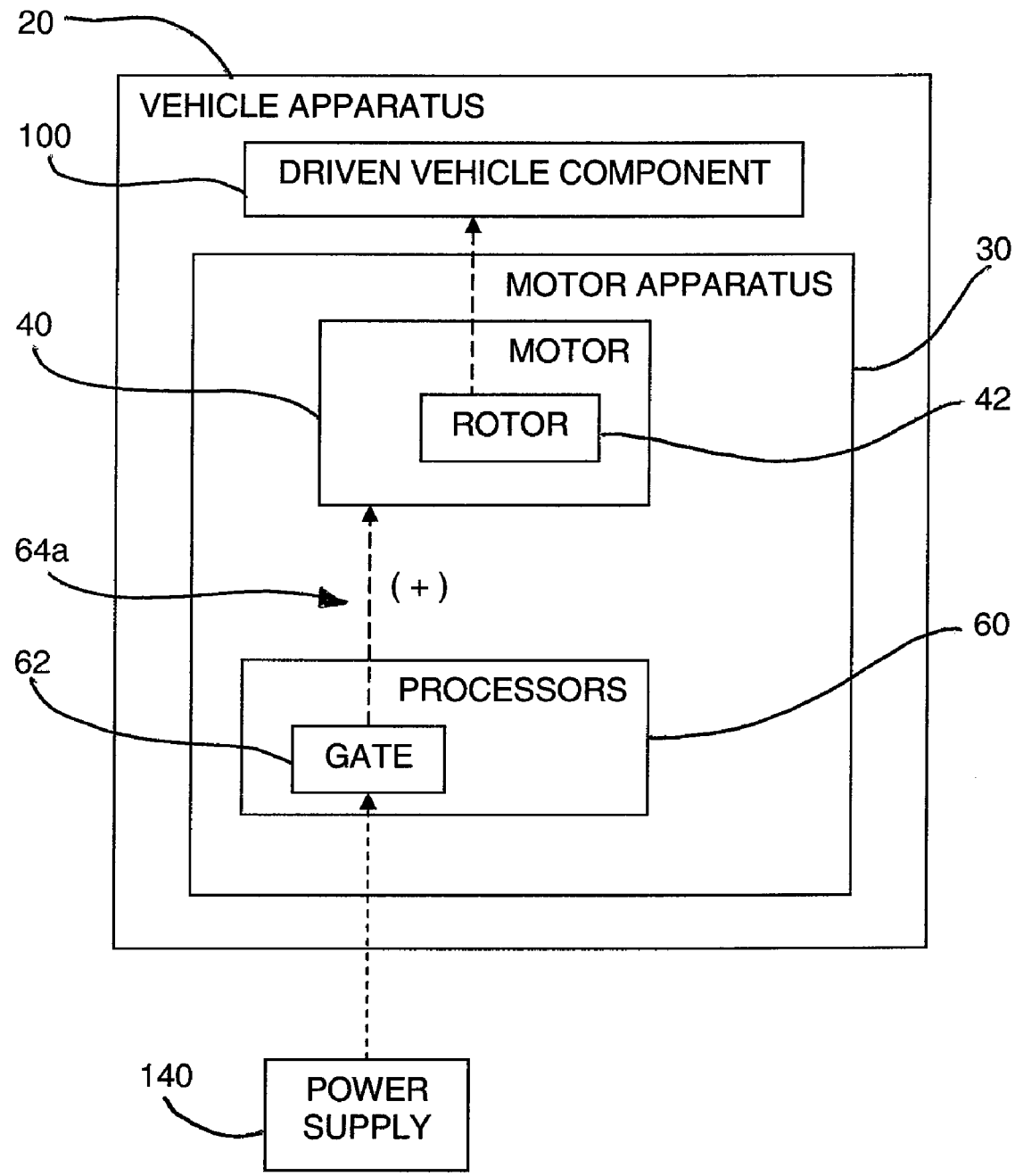
FIG. 3 is a schematic diagram depicting of the vehicle apparatus of FIG. 1, shown providing a first supply of power to the motor.

Preferably, the motor 40 is a direct current motor (and as such, the terms may hereinafter be used interchangeably) of the type that includes a rotor 42. As best seen in FIG. 7, the motor 40 is operable to move the driven component 100, and is equipped with a rotor position sensor 44. As best seen in FIG. 2, the rotor position sensor 44 may include a Hall-effect sensor 44a and/or a ripple counting sensor 44b. The ripple counting sensor 44b is one that operatively counts current modulations during commutation (not shown) of the motor 40.

As best seen in FIG. 6, the memory modules 80 contain position registers 84 that store a net count 86 of rotor position signals 46 received from the motor 40. The memory modules 80 preferably also contain memory registers 88 that store a memory position 90 for the vehicle component 100.

Preferably, and as also seen in FIG. 6, the memory modules 80 are encoded with processor-readable code 82 that is executable by the processors 60 to perform a method (according to a first preferred embodiment) 200 of accurately maintaining, in the position registers 84 (of the memory modules 80), the net count 86 of the rotor position signals 46 received from the motor 40.

As best seen in FIG. 1, the invention also extends to include processor-readable storage media 120. The storage media 120 may include removable and/or portable storage media. The storage media 120 are intended for use with the motor apparatus 30 and the driven component 100. As best seen in FIG. 1, the storage media 120 may be encoded with processor instructions 122 that, when executed by the processors 60, cause the processors 60 to perform the aforementioned method 200.

In use, and as is discussed in considerably greater detail elsewhere herein, the processors 60 selectively provide a supply of power 64 to the motor 40 (as best seen in FIG. 1). As best seen in FIG. 6, the processors 60 operatively adjust the net count 86 stored in the position registers 84. As best seen in FIGS. 7 through 8c, the processors 60 operatively monitor a motor-related parameter 54 for presence of a trip value (not shown), and will operatively terminate the first supply of power 64 in presence of the trip value.

In view of all of disclosures made herein, it will be appreciated by persons having ordinary skill in the art that the net count 86 stored in the position registers 84 will accurately correspond to an actual position 114 of the vehicle component 100 between the first and second positions, 110 and 118 respectively.

Advantageously, and as described in considerably greater detail hereinbelow, the processors 60 can also selectively return the vehicle component 100 to the memory position 90—i.e., using the net count 86 stored in the position registers 84 of the memory modules 80.

Figure 9A:
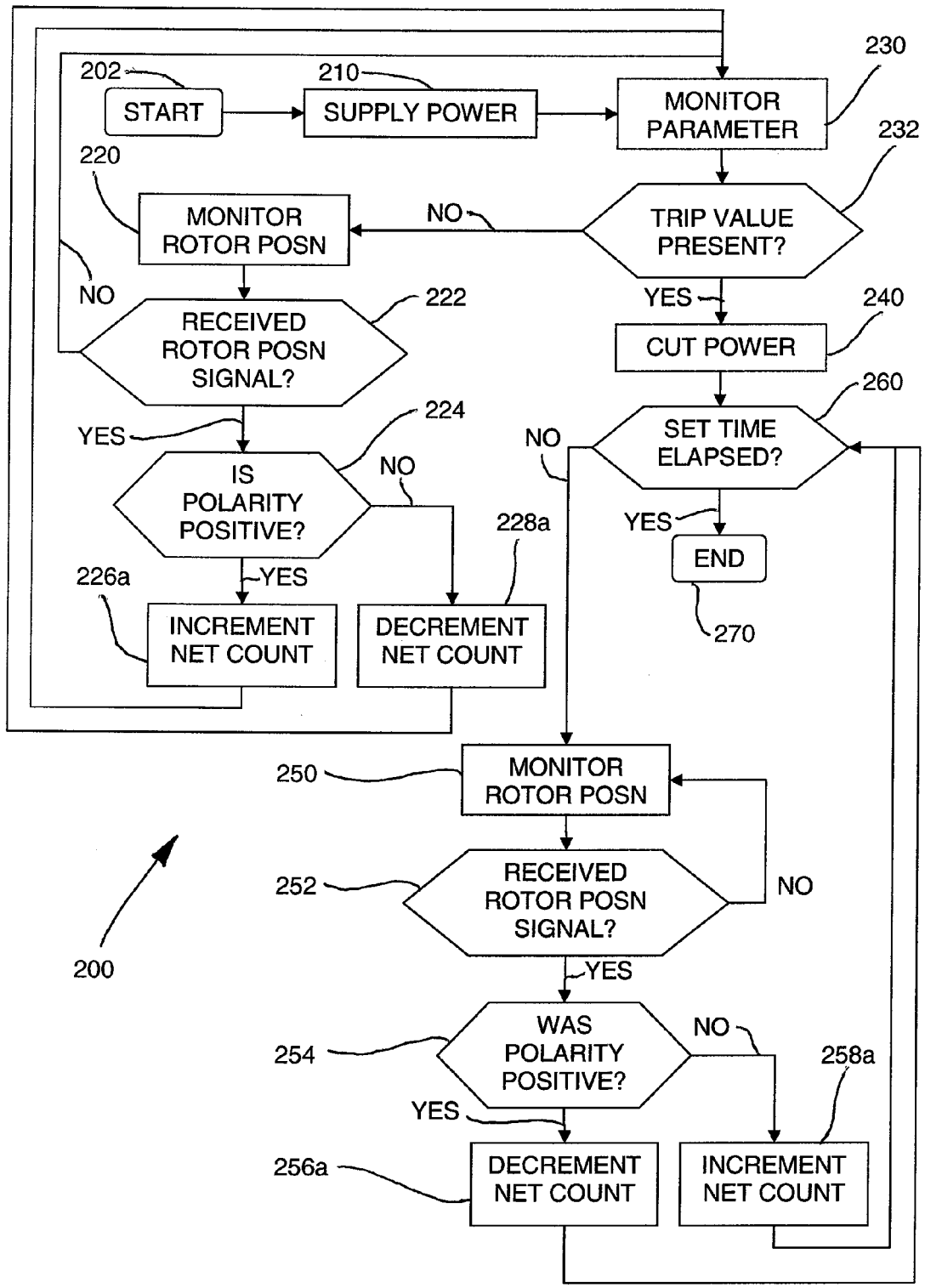
FIG. 9a depicts, in a diagrammatic flowchart, a method of counting drive motor rotations according to a first preferred embodiment of the invention.
Figure 9B:
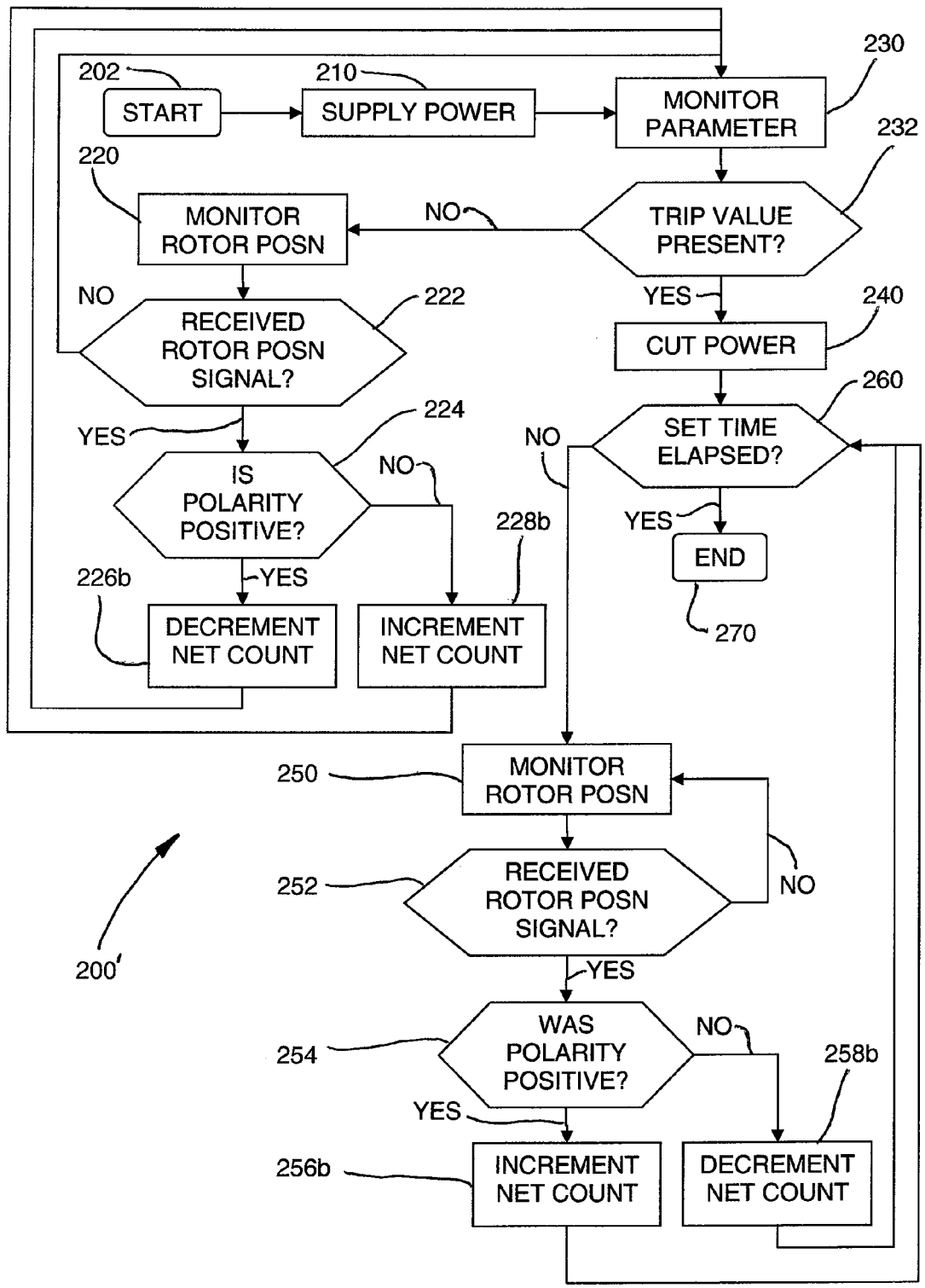
FIG. 9b depicts, in a diagrammatic flowchart, a method of counting drive motor rotations according to a second preferred embodiment of the invention.
Figure 10A:
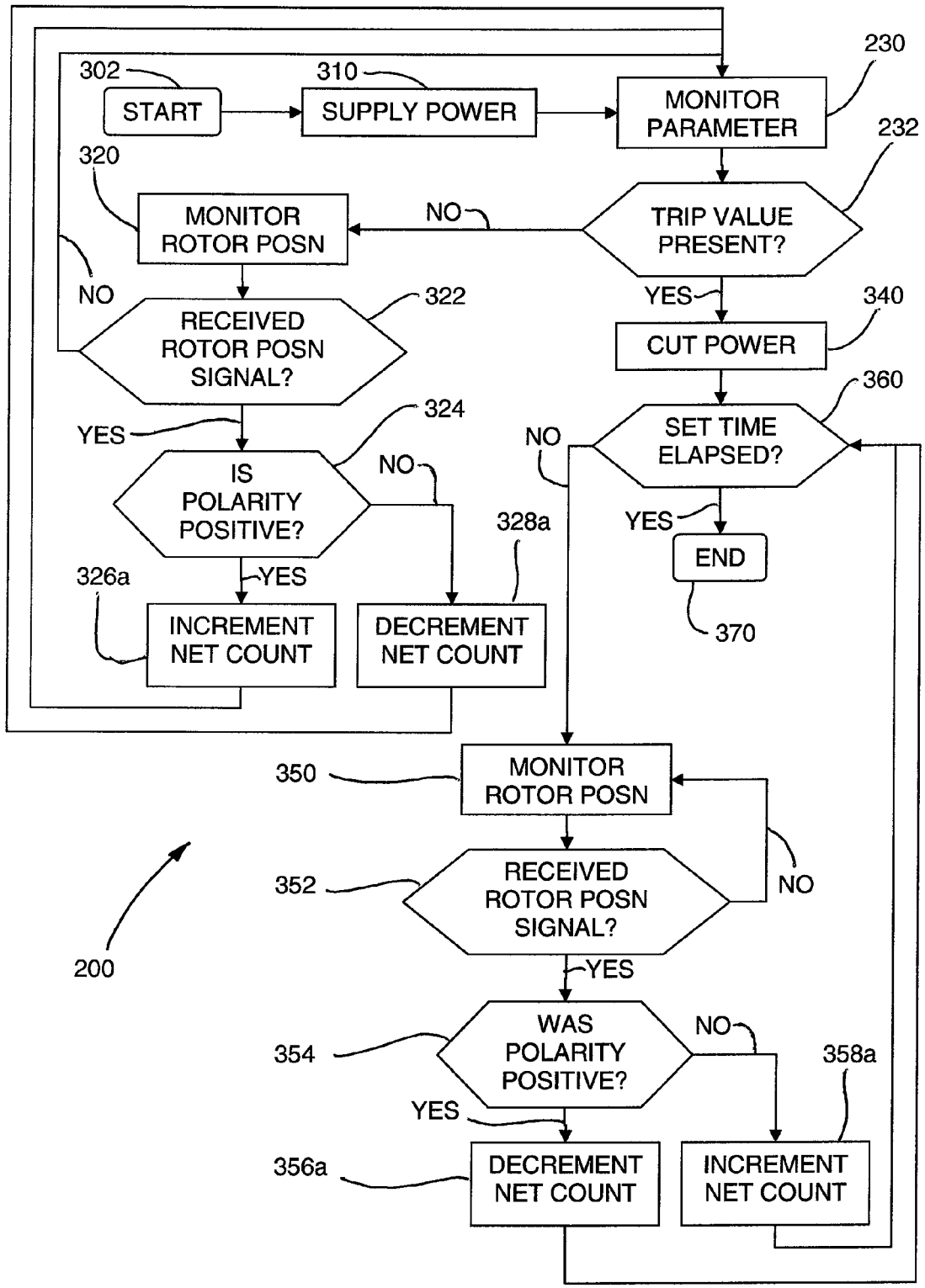
Figure 10B:
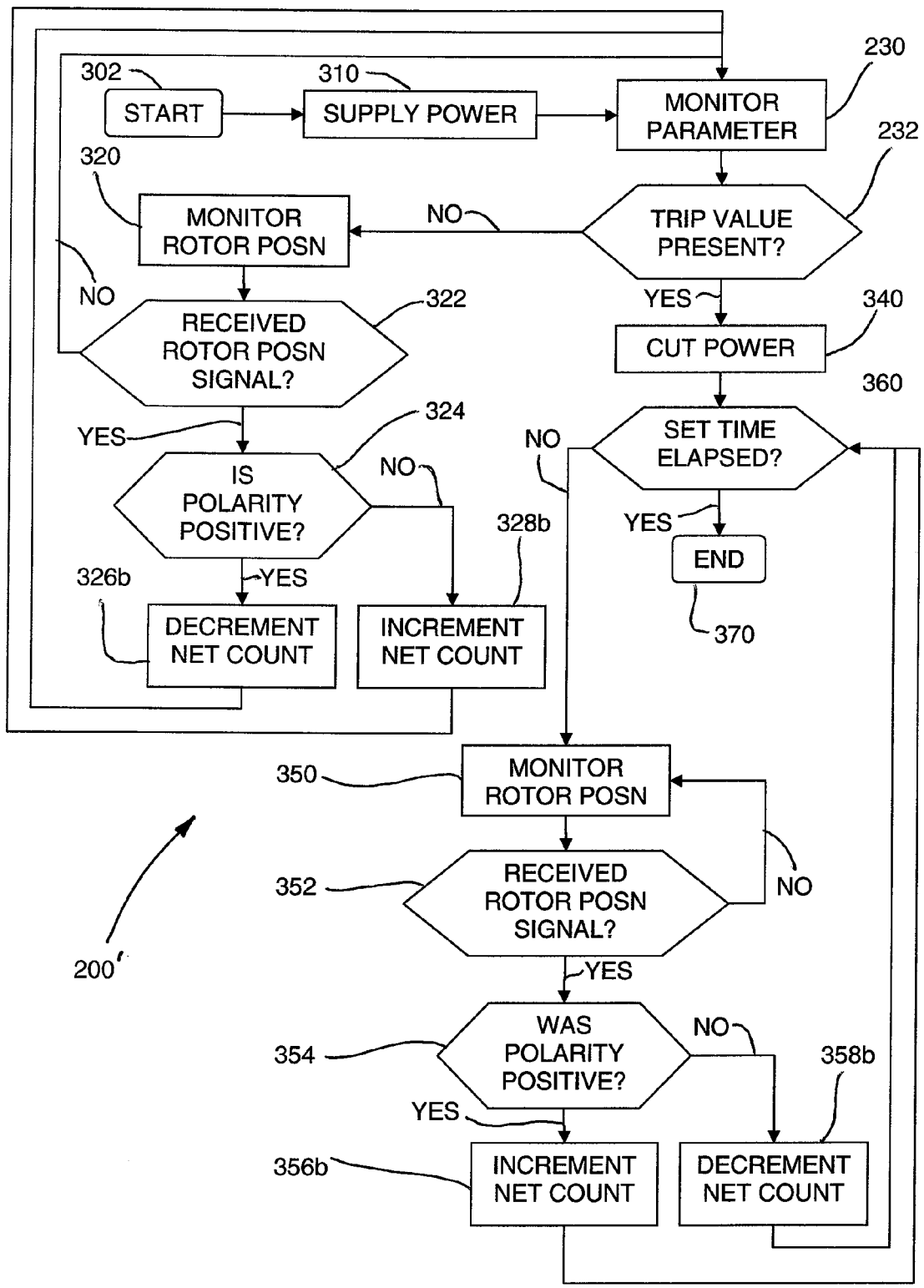
FIG. 10b depicts, in a diagrammatic flowchart, a second set of additional steps according to the invention that is supplemental to the method shown in FIG. 9b.

Now, therefore, it is appropriate to make further reference to the aforementioned first preferred embodiment of the method 200 (as shown in FIGS. 9a and 10a). It may be worthwhile to specifically note, at this stage, that the invention also includes a second preferred embodiment of the method 200' (as shown in FIGS. 9b and 10b) that differs from the first preferred embodiment 200 only in minor respects, which are discussed in detail hereinbelow. For the most part (i.e., except as may be evident from the context), references to the first preferred embodiment of the method 200 may also apply equally well to the second preferred embodiment 200'. The method 200 includes a first power-supplying step 210, a first counting step 220, a monitoring step 230, a first power-cutting step 240, and a second counting step 250 (as does the method 200').

Now, as shown in FIGS. 9a and 9b, each of the methods 200, 200' begins with a start step 202. Thereafter, in the first power-supplying step 210, a first supply 64a of power 64 is operatively provided, from a power supply 140 and through a gate subprocessor 62 in the processors 60 (as shown in FIGS. 1, 3-5 and 7-8b), to the motor 40.

After power is supplied to the motor 40, and as best seen in FIGS. 7 through 8c, the method 200 commences the monitoring step 230, wherein a motor-monitoring device 50 is used to monitor the motor-related parameter 54 (e.g., a current draw 54a of the motor 40, a speed 54b of the motor 40, or a load 54c on the motor 40) for presence of the trip value. The trip value is pre-determined to be (i.e., it is set at a value that is) indicative of either (or both) of the motor 40 and the driven component 100 having encountered a mechanical stop 130.

Figure 8A:
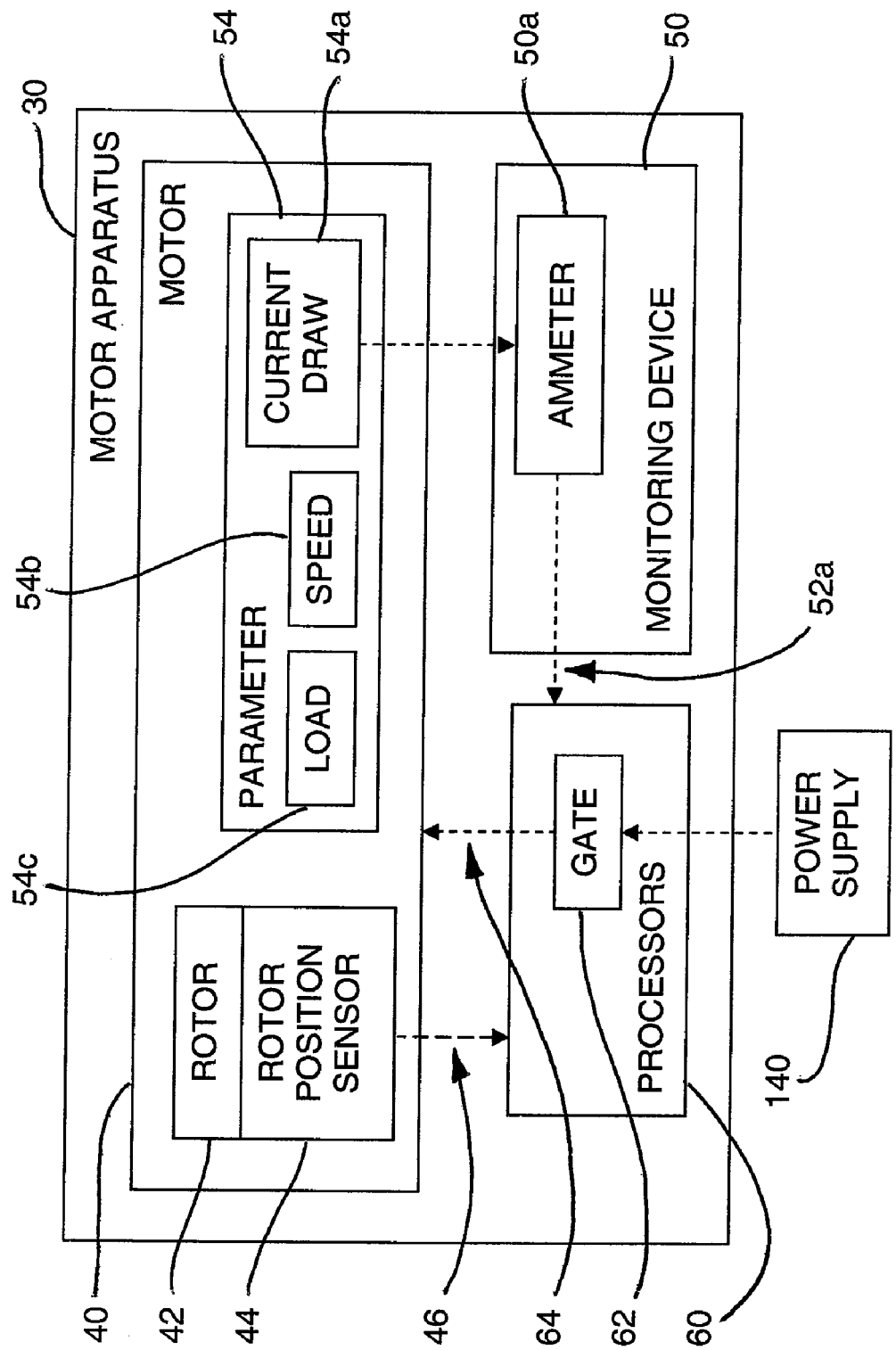
FIG. 8a is a schematic diagram of the motor apparatus of FIG. 7, showing an ammeter of the monitoring device.

As best seen in FIG. 8a, when the current draw 54a of the motor 40 is to be monitored, the processors 60 may use ammeter signals 52a received from an ammeter 50a to monitor the current draw 54a of the motor 40. The trip value may preferably be set in excess of about 10 amps.

Figure 8B:
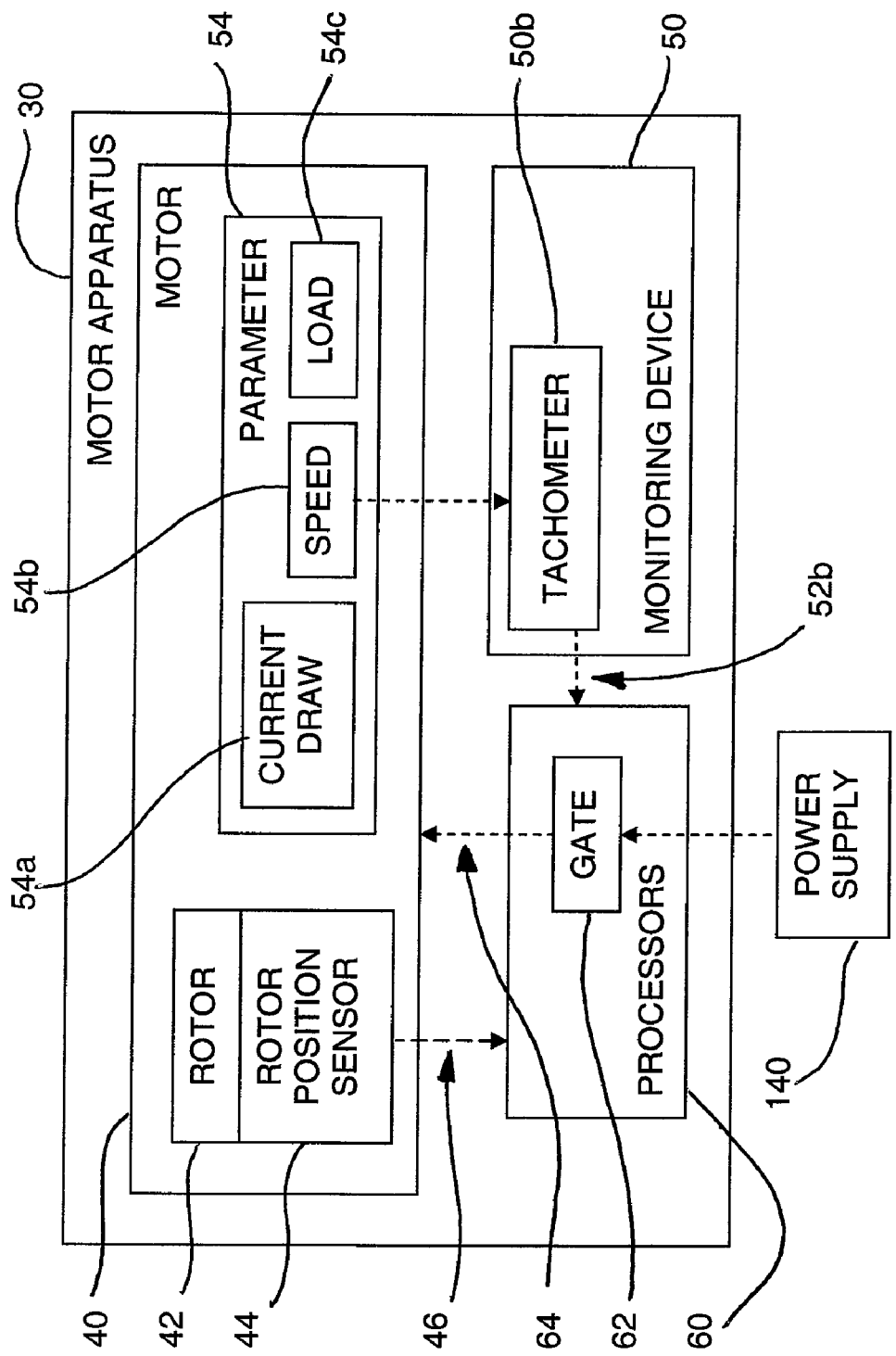
FIG. 8b is a schematic diagram of the motor apparatus of FIG. 7, showing a tachometer of the monitoring device.
Figure 8C:
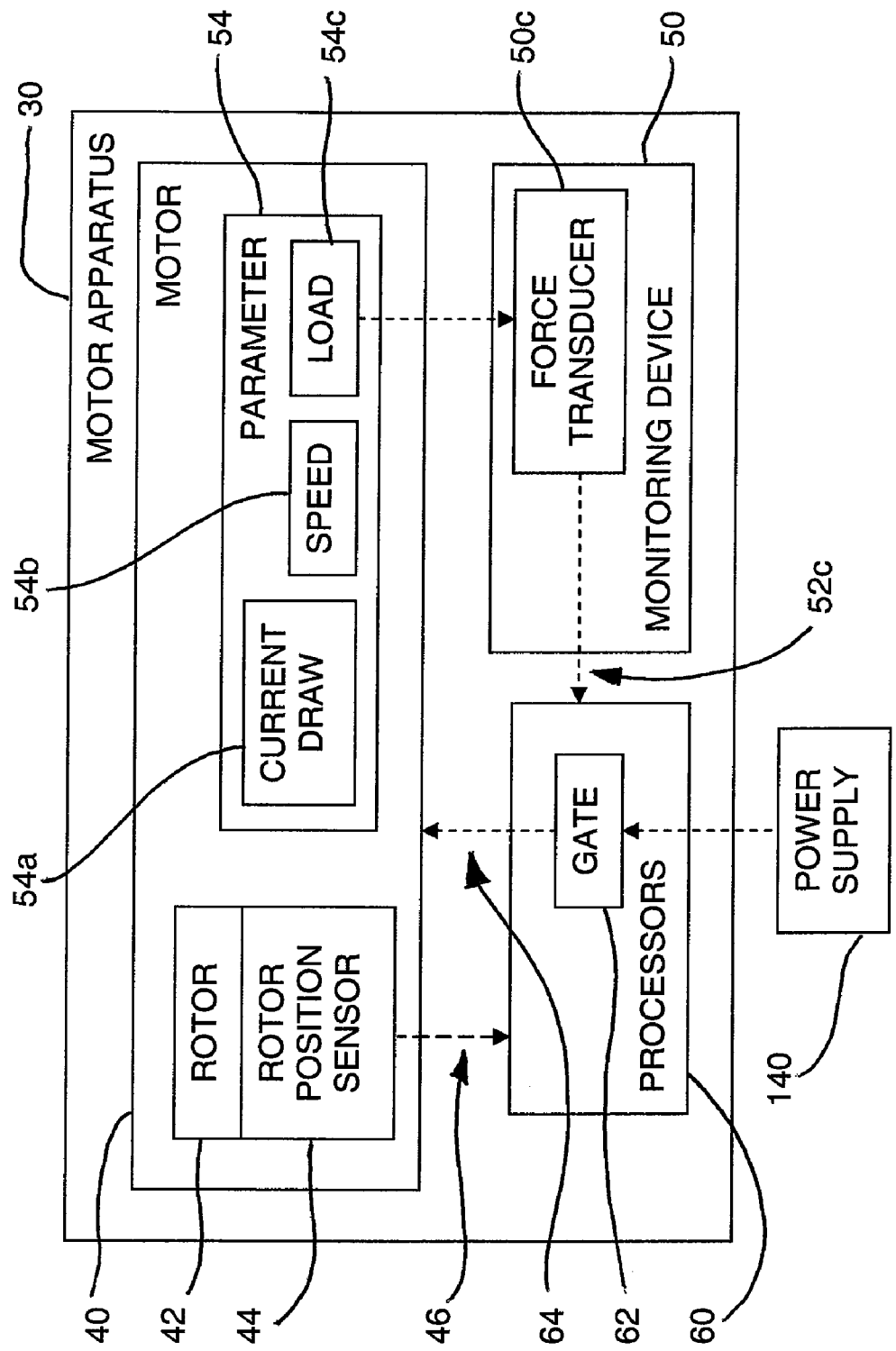
FIG. 8c is a schematic diagram of the motor apparatus of FIG. 7, showing a force transducer of the monitoring device.

As best seen in FIG. 8b, when the speed 54b of the motor 40 is to be monitored, the processors 60 may use tachometer signals 52b received from a tachometer 50b to monitor the speed 54b of the motor 40. Alternately, the processors 60 may calculate the speed 54b of the motor 40 based on the frequency of the rotor position signals 46 which are received.

As best seen in FIG. 8c, when the load 54c on the motor 40 is to be monitored, the processors 60 may use force-transducer signals 52c received from a force transducer 50c to monitor the load 54c on the motor 40.

As shown in FIGS. 9a and 9b, the monitoring step 230 may preferably include a number of queries and substeps. In a first monitoring query 232, the method 200 queries if the trip value is present. When the trip value is present, the method moves on to the first power-cutting step 240 which is discussed in greater detail hereinbelow. If, on the other hand, the trip value is absent, then the method 200 will move on to the first counting step 220.

In the first counting step 220, the net count 86 stored in the position registers 84 is adjusted by a first adjustment 68. The first adjustment 68 is directly related to a first quantity of the rotor position signals 46 which are received after the first power-supplying step 210.

As shown in FIGS. 9a and 9b, the first counting step 220 may preferably include a number of queries and substeps. In a first counting query 222, the method 200 queries whether a rotor position signal 46 has been received. If no rotor position signal 46 has been received, the method 200 returns to the monitoring step 230 (which is discussed above).

Conversely, when a rotor position signal 46 has been received, the method 200 moves on to another counting query 224, namely, to assess whether the polarity of the first supply 64a of power is positive.

As best seen in FIG. 6, the first adjustment 68 is a first one selected from an adjustment group 70 that consists of an incremental adjustment 70a and a decremental adjustment 70b. That is, the first adjustment 68 may be an incremental 70a, or a decremental 70b, adjustment to the net count 86. Now, this is one place where the second preferred embodiment of the method 200' may differ from the first preferred embodiment 200.

According to the first preferred embodiment of the method 200 (and as shown in FIG. 9a), when the polarity is positive, the method 200 proceeds to a positive polarity counting sub-step 226a, wherein the net count 86 is incrementally adjusted. Conversely, when the polarity is negative, the method 200 proceeds to a negative polarity counting substep 228a, wherein the net count 86 is decrementally adjusted.

On the other hand, according to the second preferred embodiment of the method 200' (and as shown in FIG. 9b), when the polarity is positive, the method 200 proceeds to a positive polarity counting substep 226b, wherein the net count 86 is decrementally adjusted. Conversely, when the polarity is negative, the method 200' proceeds to a negative polarity counting substep 228b, wherein the net count 86 is incrementally adjusted.

After the adjusting the net count 86 stored in the position registers 84 by the first adjustment 68, both embodiments of the method 200, 200' return to the monitoring step 230 (which is discussed above).

When the trip value is determined to be present, in the first monitoring query 232, the first supply 64a of power 64 to the motor 40 will be terminated in the first power-cutting step 240 (i.e., after the first power-supplying step 210).

Before proceeding from the first power-cutting step 240 to the second counting step 250, the method 200 may query, in step 260, whether a set amount of time has elapsed. Advantageously, the method 200 may preferably be designed to make no further counts after the set amount of time (preferably in the order of about 0.1 msec) has elapsed, so as to avoid counts due to dithering and other counts that may tend to reduce the efficacy of the invention. If the set amount of time has elapsed, then the method 200 may preferably proceed to an end step 270 (preferably prior to any further supply of power 64 to the motor 40).

If, on the other hand, the set amount of time has not elapsed, then the method 200 may preferably proceed to the second counting step 250, wherein the net count 86 stored in the position registers 84 is adjusted by a second adjustment 68. The second adjustment 68 is directly related to a second quantity of the rotor position signals 46 which are received after the first power-cutting step 240.

As shown in FIGS. 9a and 9b, the second counting step 250 may preferably include a number of queries and substeps. In query step 252, the method 200 queries whether a rotor position signal 46 has been received. If no rotor position signal 46 has been received, the method 200 returns to the beginning of second counting step 250, before proceeding again to the query step 252.

When a rotor position signal 46 has been received, the method 200 moves on to step 254, wherein the method 200 queries whether the polarity of the first supply 64a of power (before having been terminated in the first power-cutting step 240) was positive.

As best seen in FIG. 6, the second adjustment 68 may be an incremental 70a, or a decremental 70b, adjustment to the net count 86—inversely depending on whether the first adjustment 68 was an incremental 70a, or a decremental 70b, one. That is, if the first adjustment 68 was an incremental one 70a, then the second adjustment 68 will be a decremental one 70b. Conversely, if the first adjustment 68 was a decremental one 70b, then the second adjustment 68 will be an incremental one 70a. Accordingly, this is another place where the second preferred embodiment of the method 200' may differ from the first preferred embodiment 200.

According to the first preferred embodiment of the method 200 (and as shown in FIG. 9a), when the polarity is positive, the method 200 proceeds to a positive polarity substep 256a, wherein the net count 86 is decrementally adjusted. Conversely, when the polarity is negative, the method 200 proceeds to a negative polarity substep 258a, wherein the net count 86 is incrementally adjusted.

On the other hand, according to the second preferred embodiment of the method 200' (and as shown in FIG. 9b), when the polarity is positive, the method 200 proceeds to a positive polarity substep 256b, wherein the net count 86 is incrementally adjusted. Conversely, when the polarity is negative, the method 200' proceeds to a negative polarity substep 258b, wherein the net count 86 is decrementally adjusted.

After the adjusting the net count 86 stored in the position registers 84 by the second adjustment 68, both embodiments of the method 200, 200' may preferably return to the query step 260 whereupon, after the set amount of time has elapsed, the method 200 may preferably proceed to the end step 270.

Thereafter, the method 200 performed by the processors 60 may preferably, but need not necessarily, also include a first set of additional steps (as shown in FIG. 10a) that is supplemental to those shown in FIG. 9a.

It may be worthwhile to specifically note that, similarly, the method 200' performed by the processors 60 may preferably, but need not necessarily, also include a second set of additional steps (as shown in FIG. 10b) that is supplemental to those shown in FIG. 9b.

The first and second sets of additional steps (as shown in FIGS. 10a and 10b, respectively) differ from one another only in minor respects, which are discussed in detail hereinbelow. For the most part (i.e., except as will be evident from the context), references to the first set of additional steps (as shown in FIG. 10a) may also apply equally well to the second set (as shown in FIG. 10b).

In fact, the first set of additional steps (as shown in FIG. 10a) differs from the steps shown in FIG. 9a only in minor respects, which are discussed in detail hereinbelow. For the most part (i.e., except as will be evident from the context), the above discussion of the steps shown in FIG. 9a may also apply equally well to the first set of additional steps (as shown in FIG. 10a). As such, the preceding discussion of FIG. 9a is incorporated hereinafter by reference, with such changes mutatis mutandis as may be necessary to make it equally applicable to first set of additional steps (as shown in FIG. 10a).

Similarly, the second set of additional steps (as shown in FIG. 10b) differs from the steps shown in FIG. 9b only in minor respects, which are discussed in detail hereinbelow. For the most part (i.e., except as will be evident from the context), the above discussion of the steps shown in FIG. 9b may also apply equally well to the second set of additional steps (as shown in FIG. 10b). As such, the preceding discussion of FIG. 9b is incorporated hereinafter by reference, with such changes mutatis mutandis as may be necessary to make it equally applicable to second set of additional steps (as shown in FIG. 10b).

Now, as shown in FIGS. 10a and 10b, each of the first and second sets of additional steps begins with a start step 302 and includes a second power-supplying step 310, a third counting step 320, a second power-cutting step 340, and a fourth counting step 350.

Figure 4:
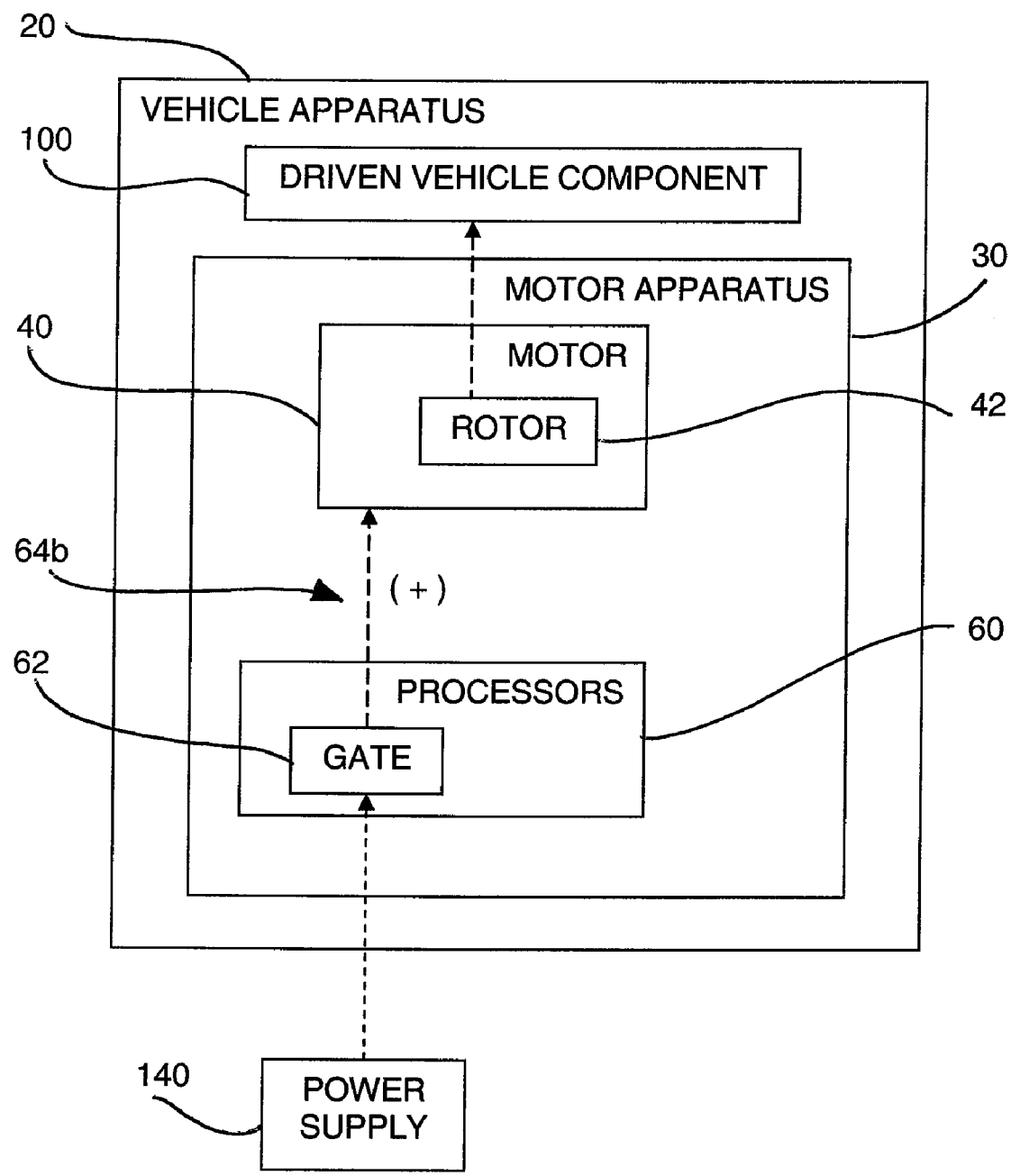
FIG. 4 is a schematic diagram similar to FIG. 3, showing a second supply of power that has the same polarity as the first supply shown in FIG. 3.

After the second counting step 250, in the second power-supplying step 310, a second supply 64b of power 64 may be selectively provided to the motor 40 (as shown in FIGS. 4 and 5).

Again, in the monitoring step 230, the motor-related parameter 54 is monitored for presence of the trip value (not shown). When the trip value is present, the second supply of power 64 to the motor 40 will be terminated in the second power-cutting step 340 (i.e., after the second power-supplying step).

In the third counting step 320, the net count 86 stored in the position registers 84 is adjusted by a third adjustment that is directly related to a third quantity of the rotor position signals 46 which are received after the second power-supplying step 310. The third adjustment is again selected from the adjustment group 70 depending on whether the first and second supplies of power, 64a and 64b respectively, have identical polarities (as may be appreciated by a comparison of FIGS. 3 and 4) or opposing polarities (as may be appreciated by a comparison of FIGS. 3 and 5).

If the first and second supplies of power, 64a and 64b respectively, have identical polarities (as may be appreciated by a comparison of FIGS. 3 and 4), the third adjustment will be in the same direction as the first adjustment (i.e., both will be incremental adjustments 70a, or both will be decremental adjustments 70b, to the net count 86).

If, on the other hand, the first and second supplies of power, 64a and 64b respectively, have opposing polarities (as may be appreciated by a comparison of FIGS. 3 and 5), the first and third adjustments will also be in opposing directions; i.e., if the first adjustment was an incremental one 70a, then the third adjustment will be a decremental one 70b (and vice-versa).

At this stage, it may be worthwhile to note that the first and second sets of additional steps (as shown in FIGS. 10a and 10b, respectively) additionally include substeps 322, 324, 326a (or 326b) and 328a (or 328b) which are performed following the second supply 64b of power to the motor 40, and which respectively correspond in all material respects to substeps 222, 224, 226a (or 226b) and 228a (or 228b) that were performed following the first supply 64a of power to the motor 40 (as shown in FIGS. 9a and 9b).

It may also be worthwhile to note that the first and second sets of additional steps (as shown in FIGS. 10a and 10b, respectively) additionally include steps 360 and 370 which are performed following the second supply 64b of power to the motor 40, and which respectively correspond in all material respects to steps 260 and 270 that were performed following the first supply 64a of power to the motor 40 (as shown in FIGS. 9a and 9b).

In the fourth counting step 350, the net count 86 stored in the position registers 84 is adjusted by a fourth adjustment. The fourth adjustment may be an incremental 70a, or a decremental 70b, adjustment to the net count 86—inversely depending on whether the third adjustment was an incremental 70a, or a decremental 70b, one. That is, if the third adjustment was an incremental one 70a, then the fourth adjustment will be a decremental one 70b. Conversely, if the third adjustment was a decremental one 70b, then the fourth adjustment will be an incremental one 70a. In any case though, the fourth adjustment will be directly related to a fourth quantity of rotor position signals 46 received after the second power-cutting step 340.

It should perhaps be noted that the first and second sets of additional steps (as shown in FIGS. 10a and 10b, respectively) additionally include substeps 352, 354, 356a (or 356b) and 358a (or 358b) which are performed following the second supply 64b of power to the motor 40, and which respectively correspond in all material respects to substeps 252, 254, 256a (or 256b) and 258a (or 258b) that were performed following the first supply 64a of power to the motor 40 (as shown in FIGS. 9a and 9b).

Advantageously, the method 200 may also include a component-return step 400 (alternately, herein referred to as a component-return subroutine 400). The component-return step 400 may preferably, but it need necessarily, occur sometime after the second counting step 250. In the component-return subroutine 400, the driven component 100 is preferably returned to the memory position 90 stored in the memory registers 88 of the memory modules 80—i.e., using the net count 86 stored in the position registers 84 of the memory modules 80.

Figure 11:
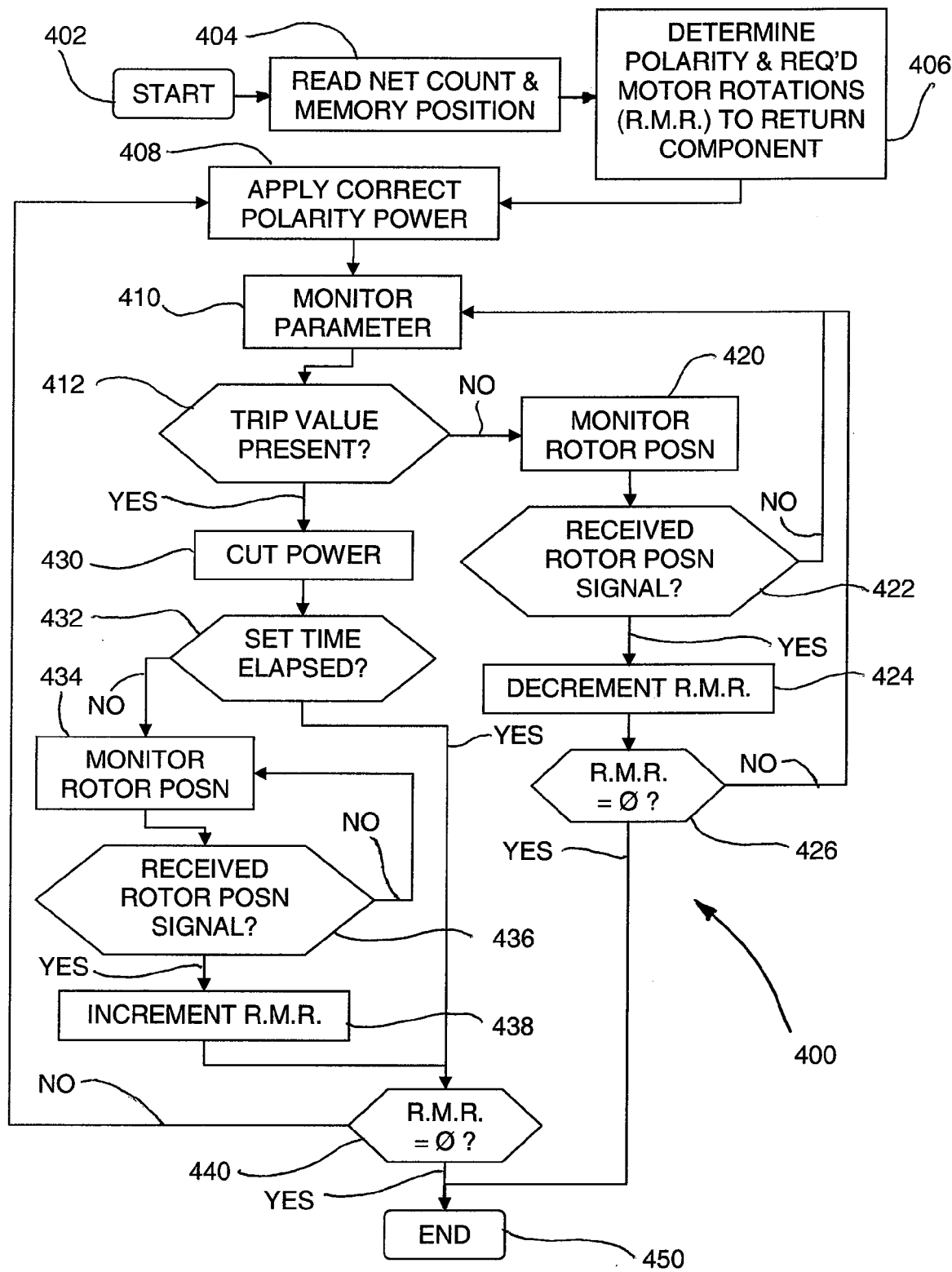
FIG. 11 depicts, in a diagrammatic flowchart, a component-return subroutine according to the invention that is supplemental to the methods shown in FIG. 9a through 10b.

As shown in FIG. 11, the component-return subroutine 400 may begin with a start step 402, and may preferably include a number of queries and substeps. After the start step 402, in substep 404, the processors read the net count 86 and the memory position 90. Following substep 404, in substep 406, the processors determine, with reference to the net count 86, the polarity and required motor rotations (hereinafter, alternately referred to as the "RMR") to return the component 100 to the memory position 90. Thereafter, in substep 408, the correct polarity of power is applied to the motor 40.

After power is supplied to the motor 40, the component-return subroutine 400 commences a monitoring substep 410, wherein the motor-monitoring device 50 is used to monitor the motor-related parameter 54 for presence of the trip value. As shown in FIG. 11, the monitoring substep 410 may preferably include a monitoring query 412 which queries whether the trip value is present. When the trip value is present, the method moves on to a subroutine power-cutting step 430 which is discussed in greater detail hereinbelow. If on the other hand, the trip value is absent, then the component-return subroutine 400 will move on to a fifth counting step 420.

In the fifth counting step 420, the RMR is decremented in direct relation to a fifth quantity of the rotor position signals 46 which are received after substep 408. As shown in FIG. 11, the fifth counting step 420 may itself preferably include a number of queries and substeps. In a counting substep 422, the component-return subroutine 400 queries whether a rotor position signal 46 has been received. If no rotor position signal 46 has been received, the component-return subroutine 400 returns to the monitoring step 430 (which is discussed above).

Conversely, when a rotor position signal 46 has been received, in substep 424, the component-return subroutine 400 decrements the RMR in direct relation to each one of the rotor position signals 46 which has been received.

Thereafter, the component-return subroutine 400 moves on to a subroutine query 426, wherein it is determined whether the RMR are now equal to zero. If the RMR are now equal to zero, then the component 100 will preferably have returned to the memory position 90 and the component-return subroutine 400 may preferably proceed to a subroutine end step 450. If, on the other hand, the RMR are not equal to zero, the component-return subroutine 400 may preferably return to the monitoring step 430 (which is discussed above).

When the trip value is determined to be present in query 412, the power 64 supplied to the motor 40 will be terminated in the subroutine power-cutting step 430 (i.e., after substep 408).

Before proceeding from step 430 to a sixth counting step 434, the component-return subroutine 400 may query, in step 432, whether a set amount of time has elapsed. If the set amount of time has elapsed, then the component-return subroutine 400 may preferably proceed to a further query step 440 (which is discussed in greater detail hereinbelow).

If, on the other hand, the set amount of time has not elapsed, then the component-return subroutine 400 may preferably proceed to the sixth counting step 434, wherein the RMR is incremented in direct relation to a sixth quantity of the rotor position signals 46 which are received after substep 430. As shown in FIG. 11, the sixth counting step 434 may itself preferably include a number of queries and substeps. In a counting substep 436, the component-return subroutine 400 queries whether a rotor position signal 46 has been received.

If no rotor position signal 46 has been received, the component-return subroutine 400 returns to step 434 (which is discussed above).

Conversely, when a rotor position signal 46 has been received, in substep 438, the component-return subroutine 400 increments the RMR in direct relation to each one of the rotor position signals 46 which has been received.

Thereafter, in query 440, the component-return subroutine 400 determines whether the RMR are now equal to zero. If the RMR are not equal to zero, the component-return subroutine 400 may preferably return to step 408 (which is discussed above). If, on the other hand, the RMR are now equal to zero, then the component 100 will preferably have returned to the memory position 90 and the component-return subroutine 400 may preferably proceed to the aforementioned subroutine end step 450.

Persons having ordinary skill in the art will appreciate that the technology of the present invention may be applied equally well to improve the accuracy of ripple-counting 44b based systems and Hall-effect sensor 44a based systems.

The memory modules 80 are preferably able to detect the obstacle 130 (or mechanical stop 130) when it is encountered by the driven component 100. Preferably, the present invention may provide for the monitoring of the current draw 54a of the drive motor 40. For example, in the context of motors 40 used to drive vehicle seat components 102 under normal operation, such current draw 54a may typically run in the range of between about 2 Amps and about 5 Amps. In contrast, a typical power seat drive motor 40 may draw a stall current in the order of about 18 Amps. According to the present invention, if the measured drive motor current 54a exceeds above about 10 amps, the power 64 to the drive motor 40 is cut, and the rotor position signals 46 detected thereafter may be deducted from the net count 86 sent to the position register 84 of the memory modules 80.

As aforesaid, alternate methods can be used to sense the seat 102 hitting an obstacle 130. For example, the tachometer 50b may be used to sense a change in speed 54b of the drive motor 40, or a force transducer 50c may be used to sense a change in load 54c on the drive motor 40. In fact, the present invention encompasses all such means of detecting the seat 102 (or other driven component 100) hitting the obstacle 130.

It will also be appreciated from the foregoing that, once contact with the obstacle 130 is detected, such as, for example, by detection of the stall current level being achieved, the software (processor-readable code or processor instructions) of the present invention may preferably helps the processors 60 to implement a recoil routine, as referenced above, to reverse further counts received from the Hall-Effect sensor 44a after the power 64 is turned off. On the other hand, if no high current is detected, the counts continue to add in the same direction. (See FIGS. 8a through 11.)

A memory module 80 constructed according to the present invention may take advantage of the fact that motor 40 rotations may occur in the reverse direction (due to system recoil) for counts detected after the power 64 is turned off.

As aforesaid, therefore, the motor current 54a may be measured according to the method 200. If the current 54a is not high, then no obstacle 130 has been detected, and the method 200 can continue to measure the motor current 54a. If the current 54a is high, then this may be indicative of the obstacle 130 having been encountered. Power 64 to the motor 40 will then be turned off. After encountering the detected obstacle 130, the motor 40 may generally tend to rotate in the opposite direction. Thereafter, the method 200 may monitors for any signals 46. Any signals 46 (alternately, herein referred to as pulses 46) that are detected may preferably result, according to the method 200, in counts being subtracted from the net count 86. Thereafter, and/or if no pulses 46 are immediately detected, then the method 200 will continue to monitor for pulses 46 for (at least) a limited period of time.

Because the memory modules 80 of the present invention may tend not to generate positional errors, it may be unnecessary to reset its seat position register 84 periodically. Therefore, the present invention may be understood by persons having ordinary skill in the art (and by ordinary end users and seat occupants) to be a solution that is much safer than prior art "reset" technologies, and may generally tend to improve customer satisfaction.

It will also be appreciated by persons having ordinary skill in the art that the present invention may find many advantageous utilizations in association with automotive vehicles seats, drive motors, and memory modules—preferably, in accurately returning driven components to stored positions. Advantageously, the present invention may be used in association with Hall-effect sensors and/or ripple-counting based systems—preferably, to accurately maintain a stored count of rotor position signals. Preferably, use of the present invention may help to avoid rotational counting errors and the generation (and accumulation) of positional errors—especially following the encountering of an obstacle (or mechanical stop) by the driven component (or motor). The use of the present invention may help to account for the actual release of force on the system following such events, e.g., rotation of the drive motor in a direction opposite to that indicated by the supplied polarity of the voltage or current. Preferably, any count error that remains may be well within acceptable parameters, such that the recorded seat (or other component) position corresponds to its actual position. In this manner, among others, it may be expected to result in reduced customer irritation and/or in increased safety. Of course, the present invention may also preferably be used in association with other motor-driven components, such as, for example, other vehicle components including adjustable mirrors, pedals, and/or steering columns. Preferably, the use of the present invention may enable widespread adoption by various OEMs of Hall-effect sensor based and ripple-counting based systems.

The present invention may also avoid the undue accumulation of positional errors, without the use (and concomitant irritation associated with the use) of "reset" technologies, so as to provide for safety of passengers and/or stowed items. Preferably, the present invention may provide an affordable, low noise, small package size, and/or a high resolution solution to the problems associated with the prior art. Preferably, the use of the present invention may help to eliminate and/or minimize these positional errors, and/or to mitigate their negative consequences, in Hall-effect sensor and ripple-counting based systems. Preferably, the use of the present invention may help to provide a memory module system that is able to detect a mechanical stop or obstacle that is encountered by the driven component. Preferably, the use of the present invention may help to provide a technology which is equally applicable in improving the accuracy of Hall-effect and ripple-counting based systems. Preferably, the use of the present invention may help to provide a component position recording device that may be relatively inexpensive to manufacture, may be readily mass-produced, and/or one that may fits into a relatively small design envelope. Preferably, the use of the present invention may help to provide such a system that is both highly reliable and cost effective. As such, the use of the present invention may preferably help to obviate or mitigate at least one of the above-mentioned disadvantages of the prior art.

Of course, other modifications and alterations may be used in the design and manufacture of other embodiments according to the present invention without departing from the spirit and scope of the invention, which is limited only by the accompanying claims.

I claim:

1. A method of accurately maintaining, in one or more position registers of one or more memory modules, a stored net count of rotor position signals received from a motor equipped with a rotor position sensor, with the motor being operable to move a driven component, the method comprising the steps of:
   a first power-supplying step of operatively providing a first supply of power to the motor;
   a first counting step of adjusting the net count, stored in the position registers, by a first adjustment directly related to a first quantity of rotor position signals received after the first power-supplying step;
   a monitoring step of monitoring at least one motor-related parameter for presence of a trip value indicative of one or more of the motor and the driven component having encountered a mechanical stop;
   a first power-cutting step, after the first power-supplying step, of terminating the first supply of power in presence of the trip value; and
   a second counting step of adjusting the net count, stored in the position registers, by a second adjustment directly related to a second quantity of rotor position signals received after the first power-cutting step;
   wherein the first adjustment is a first one selected from an adjustment group consisting of an incremental adjustment and a decremental adjustment; and wherein the second adjustment is the respective other one selected from the adjustment group.

2. A method according to claim 1, further comprising a component-return step, after the second counting step, of returning the driven component to a memory position stored in one or more memory registers of the memory modules using the net count stored in the position registers of the memory modules.

3. A method according to claim 1, wherein the motor-related parameter comprises a current draw of the motor, and wherein in the monitoring step, an ammeter monitors the current draw of the motor.

4. A method according to claim 3, wherein the trip value is in excess of about 10 amps.

5. A method according to claim 1, wherein the motor-related parameter comprises a speed of the motor.

6. A method according to claim 5, wherein in the monitoring step, a tachometer monitors the speed of the motor.

7. A method according to claim 1, wherein the motor-related parameter comprises a load on the motor, and wherein in the monitoring step, a force transducer monitors the load on the motor.

8. A method according to claim 1, further comprising:
   a second power-supplying step, after the second counting step, of providing a second supply of power to the motor; and
   a third counting step of adjusting the net count, stored in the position registers, by a third adjustment directly related to a third quantity of rotor position signals received after the second power-supplying step;
   wherein: (i) when the first supply and the second supply have identical polarities, the third adjustment is the first one selected from the adjustment group; and (ii) when the first supply and the second supply have opposing polarities, the third adjustment is the respective other one selected from the adjustment group.

9. A method according to claim 8, further comprising:
   a second power-cutting step, after the second power-supplying step, of terminating the second supply of power in presence of the trip value; and
   a fourth counting step of adjusting the net count, stored in the position registers, by a fourth adjustment directly related to a fourth quantity of rotor position signals received after the second power-cutting step;
   wherein: (i) when the first supply and the second supply have opposing polarities, the fourth adjustment is the first one selected from the adjustment group; and (ii) when the first supply and the second supply have identical polarities, the fourth adjustment is the respective other one selected from the adjustment group.

10. One or more non-transitory processor-readable memory modules for use with one or more processors, a motor equipped with a rotor position sensor, and a driven component that is operatively moved by the motor; with the memory modules comprising one or more position registers, and wherein the memory modules are encoded with processor-readable code that is executable by the processors to perform a method of accurately maintaining, in the position registers, a stored net count of rotor position signals received from the motor, the method comprising the steps of:
   a first power-supplying step of operatively providing a first supply of power to the motor;
   a first counting step of adjusting the net count, stored in the position registers, by a first adjustment directly related to a first quantity of rotor position signals received after the first power-supplying step;
   a monitoring step of monitoring at least one motor-related parameter for presence of a trip value indicative of one or more of the motor and the driven component having encountered a mechanical stop;
   a first power-cutting step, after the first power-supplying step, of terminating the first supply of power in presence of the trip value; and
   a second counting step of adjusting the net count, stored in the position registers, by a second adjustment directly related to a second quantity of rotor position signals received after the first power-cutting step;
   wherein the first adjustment is a first one selected from an adjustment group consisting of an incremental adjustment and a decremental adjustment; and wherein the second adjustment is the respective other one selected from the adjustment group.

11. One or more memory modules according to claim 10, further comprising one or more memory registers adapted to store a memory position for the driven component, and wherein the method further comprises a component-return step, after the second counting step, of returning the driven component to the memory position using the net count stored in the position registers of the memory modules.

12. One or more memory modules according to claim 10, wherein the motor-related parameter comprises a current draw of the motor, and wherein in the monitoring step of the method, the processors use ammeter signals received from an ammeter to monitor the current draw of the motor.

13. One or more memory modules according to claim 12, wherein the trip value is in excess of about 10 amps.

14. One or more memory modules according to claim 10, wherein the motor-related parameter comprises a speed of the motor.

15. One or more memory modules according to claim 14, wherein in the monitoring step, the processors use tachometer signals received from a tachometer to monitor the speed of the motor.

16. One or more memory modules according to claim 10, wherein the motor-related parameter comprises a load on the motor, and wherein in the monitoring step, the processors use force-transducer signals received from a force transducer to monitor the load on the motor.

17. One or more memory modules according to claim 10, wherein the method further comprises:
   a second power-supplying step, after the second counting step, of providing a second supply of power to the motor; and
   a third counting step of adjusting the net count, stored in the position registers, by a third adjustment directly related to a third quantity of rotor position signals received after the second power-supplying step;
   wherein: (i) when the first supply and the second supply have identical polarities, the third adjustment is the first one selected from the adjustment group; and (ii) when the first supply and the second supply have opposing polarities, the third adjustment is the respective other one selected from the adjustment group.

18. One or more memory modules according to claim 17, wherein the method further comprises:
   a second power-cutting step, after the second power-supplying step, of terminating the second supply of power in presence of the trip value; and
   a fourth counting step of adjusting the net count, stored in the position registers, by a fourth adjustment directly related to a fourth quantity of rotor position signals received after the second power-cutting step;
   wherein: (i) when the first supply and the second supply have opposing polarities, the fourth adjustment is the first one selected from the adjustment group; and (ii) when the first supply and the second supply have identical polarities, the fourth adjustment is the respective other one selected from the adjustment group.

19. One or more non-transitory processor-readable storage media for use with one or more processors, a motor equipped with a rotor position sensor, a driven component that is operatively moved by the motor, and one or more processor-readable memory modules that contain one or more position registers; with the storage media being encoded with processor instructions that, when executed by the processors, cause the processors to perform a method of accurately maintaining, in the position registers, a stored net count of rotor position signals received from the motor, the method comprising the steps of:
   a first power-supplying step of operatively providing a first supply of power to the motor;
   a first counting step of adjusting the net count, stored in the position registers, by a first adjustment directly related to a first quantity of rotor position signals received after the first power-supplying step;
   a monitoring step of monitoring at least one motor-related parameter for presence of a trip value indicative of one or more of the motor and the driven component having encountered a mechanical stop;
   a first power-cutting step, after the first power-supplying step, of terminating the first supply of power in presence of the trip value; and
   a second counting step of adjusting the net count, stored in the position registers, by a second adjustment directly related to a second quantity of rotor position signals received after the first power-cutting step;
   wherein the first adjustment is a first one selected from an adjustment group consisting of an incremental adjustment and a decremental adjustment; and wherein the second adjustment is the respective other one selected from the adjustment group.

20. One or more storage media according to claim 19, wherein the method further comprises a component-return step, after the second counting step, of returning the driven component to a memory position stored in one or more memory registers of the memory modules using the net count stored in the position registers of the memory modules.

21. One or more storage media according to claim 19, wherein the motor-related parameter comprises a current draw of the motor, and wherein in the monitoring step of the method, the processors use ammeter signals received from an ammeter to monitor the current draw of the motor.

22. One or more storage media according to claim 21, wherein the trip value is in excess of about 10 amps.

23. One or more storage media according to claim 19, wherein the motor-related parameter comprises a speed of the motor.

24. One or more storage media according to claim 23, wherein in the monitoring step, the processors use tachometer signals received from a tachometer to monitor the speed of the motor.

25. One or more storage media according to claim 19, wherein the motor-related parameter comprises a load on the motor, and wherein in the monitoring step, the processors use force-transducer signals received from a force transducer to monitor the load on the motor.

26. One or more storage media according to claim 19, wherein the method further comprises:
   a second power-supplying step, after the second counting step, of providing a second supply of power to the motor; and
   a third counting step of adjusting the net count, stored in the position registers, by a third adjustment directly related to a third quantity of rotor position signals received after the second power-supplying step;
   wherein: (i) when the first supply and the second supply have identical polarities, the third adjustment is the first one selected from the adjustment group; and (ii) when the first supply and the second supply have opposing polarities, the third adjustment is the respective other one selected from the adjustment group.

27. One or more storage media according to claim 26, wherein the method further comprises:
   a second power-cutting step, after the second power-supplying step, of terminating the second supply of power in presence of the trip value; and
   a fourth counting step of adjusting the net count, stored in the position registers, by a fourth adjustment directly related to a fourth quantity of rotor position signals received after the second power-cutting step;
   wherein: (i) when the first supply and the second supply have opposing polarities, the fourth adjustment is the first one selected from the adjustment group; and (ii) when the first supply and the second supply have identical polarities, the fourth adjustment is the respective other one selected from the adjustment group.

28. A motor apparatus, for use in operatively moving a driven component between first and second positions, comprising:

a) a motor equipped with a rotor position sensor;
b) one or more processor-readable memory modules that contain one or more position registers adapted to store a net count of rotor position signals received from the motor; and
c) one or more processors operatively adapted to:
  i) provide a first supply of power to the motor;
  ii) adjust the net count, stored in the position registers, by a first adjustment directly related to a first quantity of rotor position signals received after providing the first supply of power to the motor;
  iii) monitor at least one motor-related parameter for presence of a trip value indicative of one or more of the motor and the driven component having encountered a mechanical stop;
  iv) terminate the first supply of power in presence of the trip value; and
  v) adjust the net count, stored in the position registers, by a second adjustment directly related to a second quantity of rotor position signals received after terminating the first supply of power;
wherein the first adjustment is a first one selected from an adjustment group consisting of an incremental adjustment and a decremental adjustment; and wherein the second adjustment is the respective other one selected from the adjustment group; and whereby the net count stored in the position registers of the memory modules accurately corresponds to an actual position of the driven component between the first and second positions.

29. An apparatus according to claim 28, wherein the memory modules further comprise one or more memory registers adapted to store a memory position for the driven component, and wherein the processors are operatively adapted to selectively return the driven component to the memory position, using the net count stored in the position registers of the memory modules.

30. An apparatus according to claim 28, wherein the motor comprises a direct current motor.

31. An apparatus according to claim 28, wherein the rotor position sensor comprises a Hall-effect sensor.

32. An apparatus according to claim 28, wherein the rotor position sensor comprises a ripple counting sensor that operatively counts current modulations during commutation of the motor.

33. A vehicle apparatus comprising:
a) a motor equipped with a rotor position sensor;
b) a driven vehicle component operatively movable by the motor between first and second positions;
c) one or more processor-readable memory modules that contain one or more position registers adapted to store a net count of rotor position signals received from the motor; and
d) one or more processors operatively adapted to:
  i) provide a first supply of power to the motor;
  ii) adjust the net count, stored in the position registers, by a first adjustment directly related to a first quantity of rotor position signals received after providing the first supply of power to the motor;
  iii) monitor at least one motor-related parameter for presence of a trip value indicative of one or more of the motor and the driven component having encountered a mechanical stop;
  iv) terminate the first supply of power in presence of the trip value; and
  v) adjust the net count, stored in the position registers, by a second adjustment directly related to a second quantity of rotor position signals received after terminating the first supply of power;
wherein the first adjustment is a first one selected from an adjustment group consisting of an incremental adjustment and a decremental adjustment; and wherein the second adjustment is the respective other one selected from the adjustment group; and whereby the net count stored in the position registers accurately corresponds to an actual position of the vehicle component between the first and second positions.

34. An apparatus according to claim 33, wherein the memory modules further comprise one or more memory registers adapted to store a memory position for the vehicle component, and wherein the processors are operatively adapted to selectively return the vehicle component to the memory position, using the net count stored in the position registers of the memory modules.

35. An apparatus according to claim 33, wherein the vehicle component comprises a vehicle seat.

36. An apparatus according to claim 33, wherein the vehicle component comprises a vehicle steering column.

37. An apparatus according to claim 33, wherein the vehicle component comprises one or more vehicle side-view mirrors.

38. An apparatus according to claim 33, wherein the vehicle component comprises one or more vehicle pedals.

* * * * *